(12) United States Patent
Johnson et al.

(10) Patent No.: US 8,533,884 B1
(45) Date of Patent: Sep. 17, 2013

(54) FOLD OUT RAMP

(71) Applicants: David Johnson, Modesto, CA (US);
Donald Morris, Littleton, CO (US)

(72) Inventors: David Johnson, Modesto, CA (US);
Donald Morris, Littleton, CO (US)

(73) Assignee: Lift-U, division of Hogan Mfg., Inc.,
Escalon, CA (US)

( * ) Notice: Subject to any disclaimer, the term of this patent is extended or adjusted under 35 U.S.C. 154(b) by 0 days.

(21) Appl. No.: 13/679,470

(22) Filed: Nov. 16, 2012

Related U.S. Application Data

(63) Continuation-in-part of application No. 13/454,858, filed on Apr. 24, 2012, now Pat. No. 8,375,496, which is a continuation of application No. 13/350,642, filed on Jan. 13, 2012, now Pat. No. 8,250,693, which is a continuation-in-part of application No. 13/015,439, filed on Jan. 27, 2011, now Pat. No. 8,132,281.

(60) Provisional application No. 61/596,117, filed on Feb. 7, 2012.

(51) Int. Cl.
*E01D 1/00* (2006.01)

(52) U.S. Cl.
USPC .............. 14/71.3; 14/71.1; 414/537; 414/921

(58) Field of Classification Search
USPC .......................... 14/71.1, 71.3; 414/537, 921
See application file for complete search history.

(56) References Cited

U.S. PATENT DOCUMENTS

| | | | | |
|---|---|---|---|---|
| 5,391,041 | A * | 2/1995 | Stanbury et al. | 414/537 |
| 5,636,399 | A * | 6/1997 | Tremblay et al. | 14/71.1 |
| 5,871,329 | A * | 2/1999 | Tidrick et al. | 414/537 |
| 6,343,908 | B1 | 2/2002 | Oudsten | |
| 6,409,458 | B1 * | 6/2002 | Cohn et al. | 414/537 |
| 6,602,041 | B2 * | 8/2003 | Lewis et al. | 414/537 |
| 6,802,095 | B1 * | 10/2004 | Whitmarsh et al. | 14/71.3 |
| 6,843,635 | B2 * | 1/2005 | Cohn | 414/549 |
| 7,100,233 | B2 * | 9/2006 | Alexander et al. | 14/71.3 |
| 8,166,594 | B1 * | 5/2012 | Morris | 14/71.3 |
| 8,250,693 | B1 * | 8/2012 | Johnson et al. | 14/71.3 |
| 8,359,691 | B2 | 1/2013 | Morris | |
| 8,375,496 | B1 * | 2/2013 | Johnson et al. | 14/71.3 |

* cited by examiner

*Primary Examiner* — Gary Hartmann
(74) *Attorney, Agent, or Firm* — Christensen O'Connor Johnson Kindness PLLC

(57) ABSTRACT

A ramp assembly provides a transition surface from a vehicle floor to an alighting surface and includes a ramp portion coupled for reciprocating movement between a stowed position and a deployed position. The ramp portion has a cam surface disposed thereon, and a cam follower that engages the cam surface when the ramp portion is in the stowed position to support the ramp portion. The ramp assembly further includes a panel rotatably coupled to a first end of the ramp portion about an axis. An actuator rotates a drive arm to move the ramp portion through first and second phases of a deployment motion. During the first phase, the drive arm rotates the ramp portion about the axis, which maintains a substantially fixed position. During the second phase, the drive arm moves the second axis in a downward direction.

21 Claims, 21 Drawing Sheets

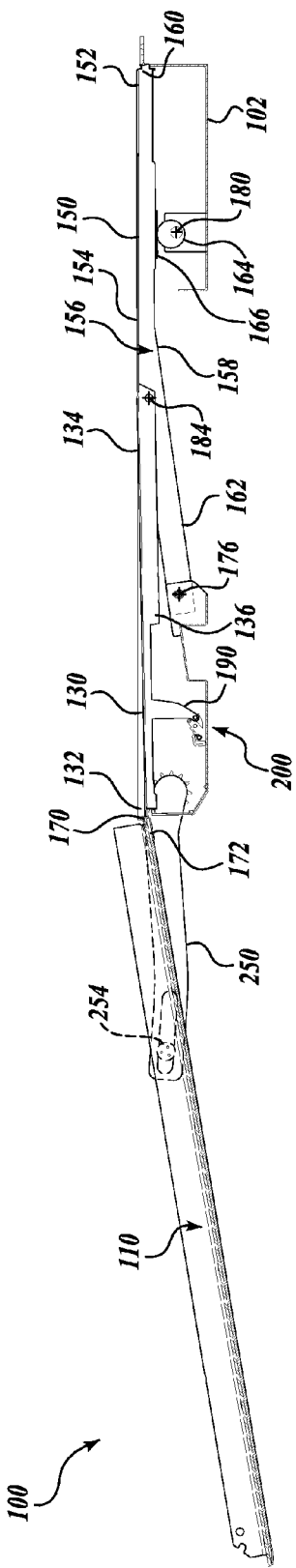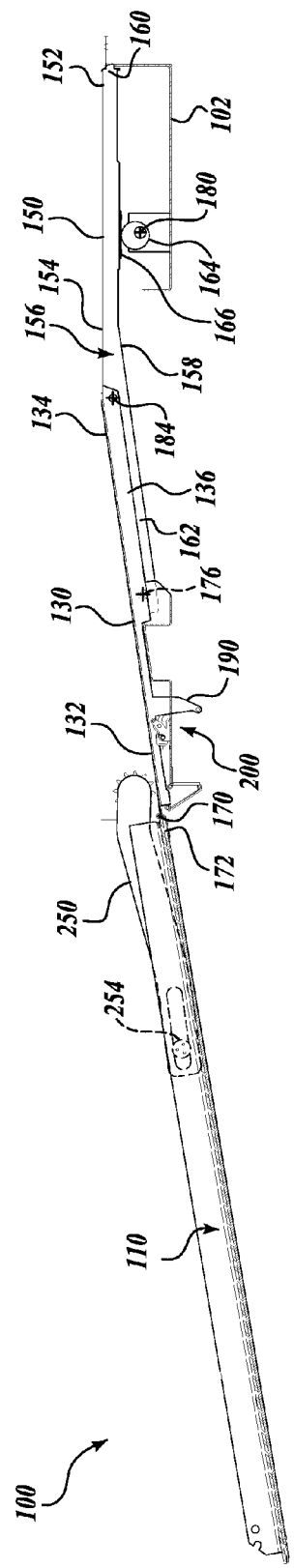

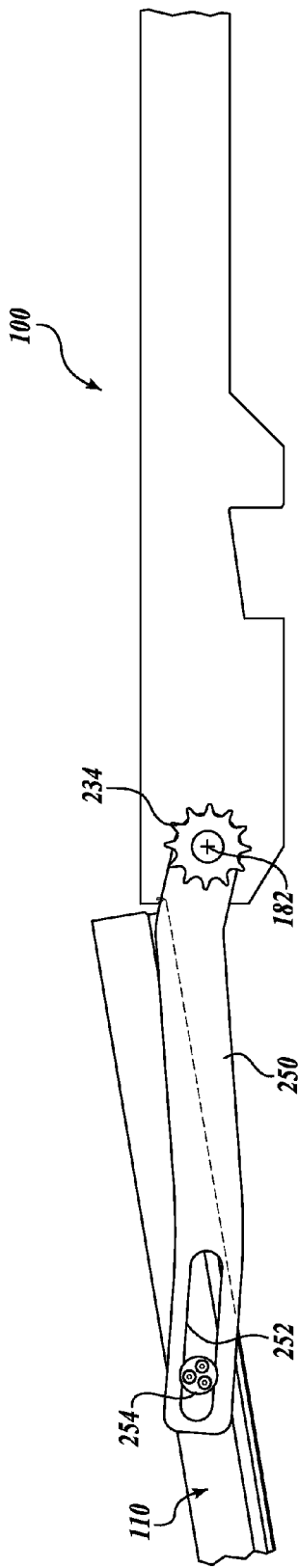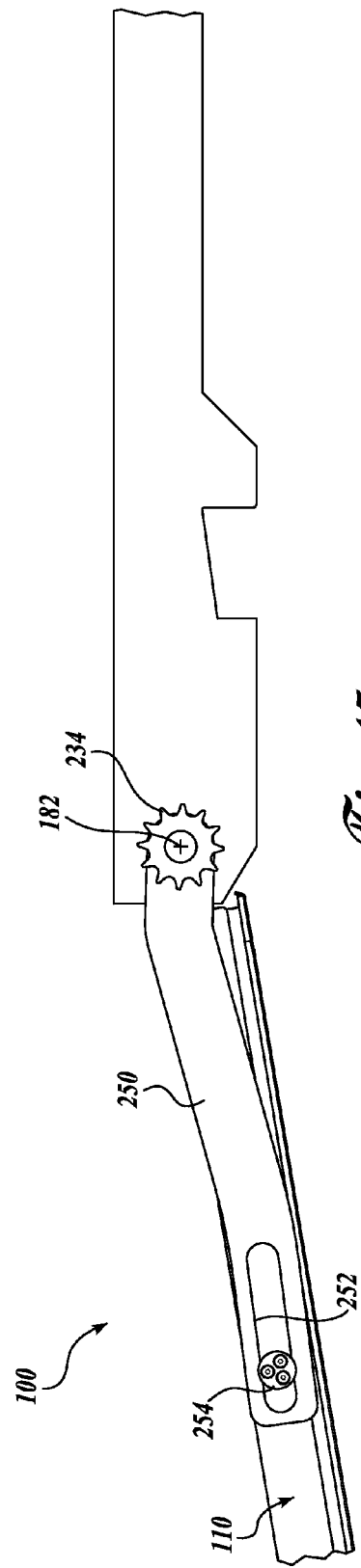

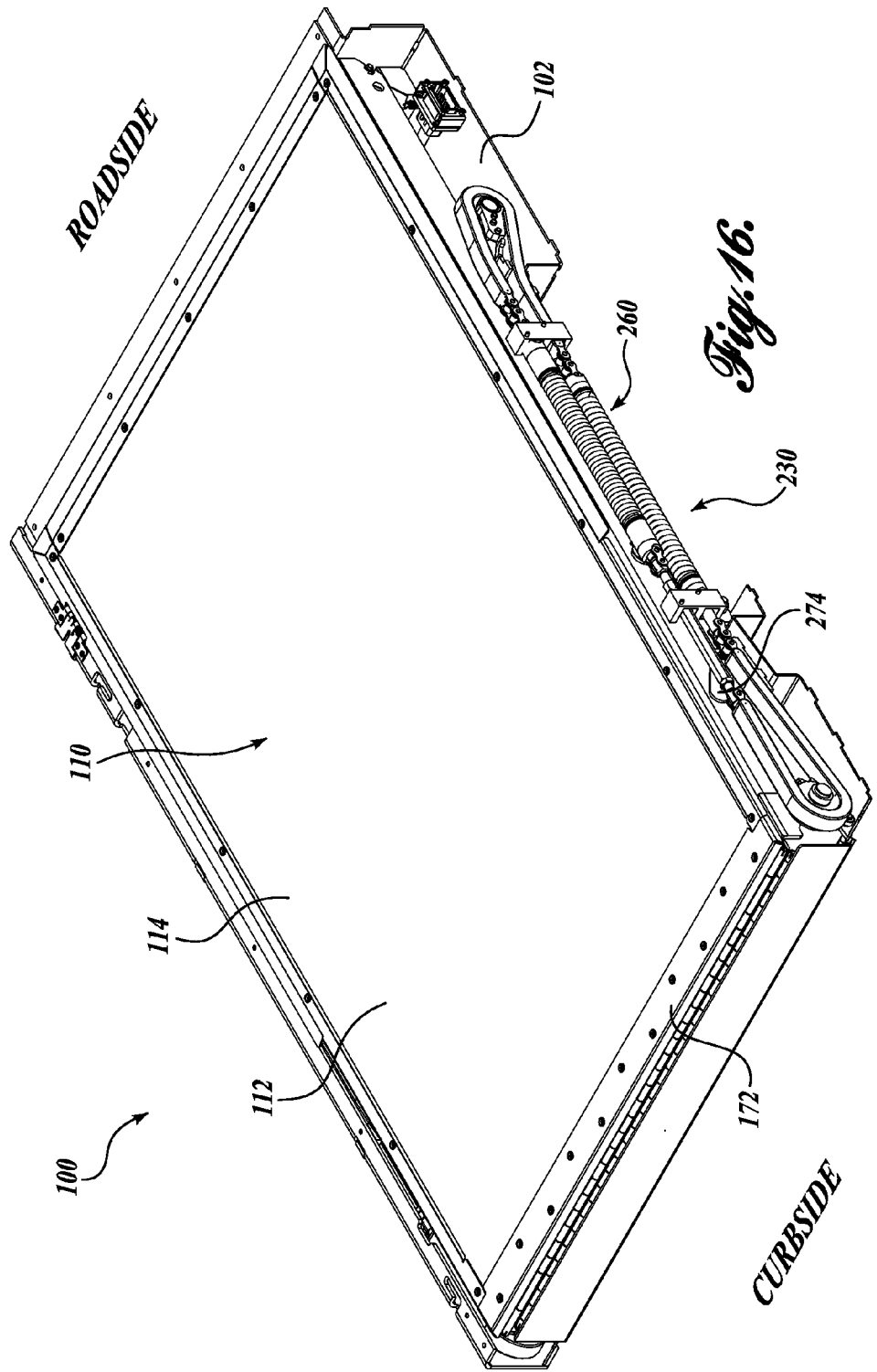

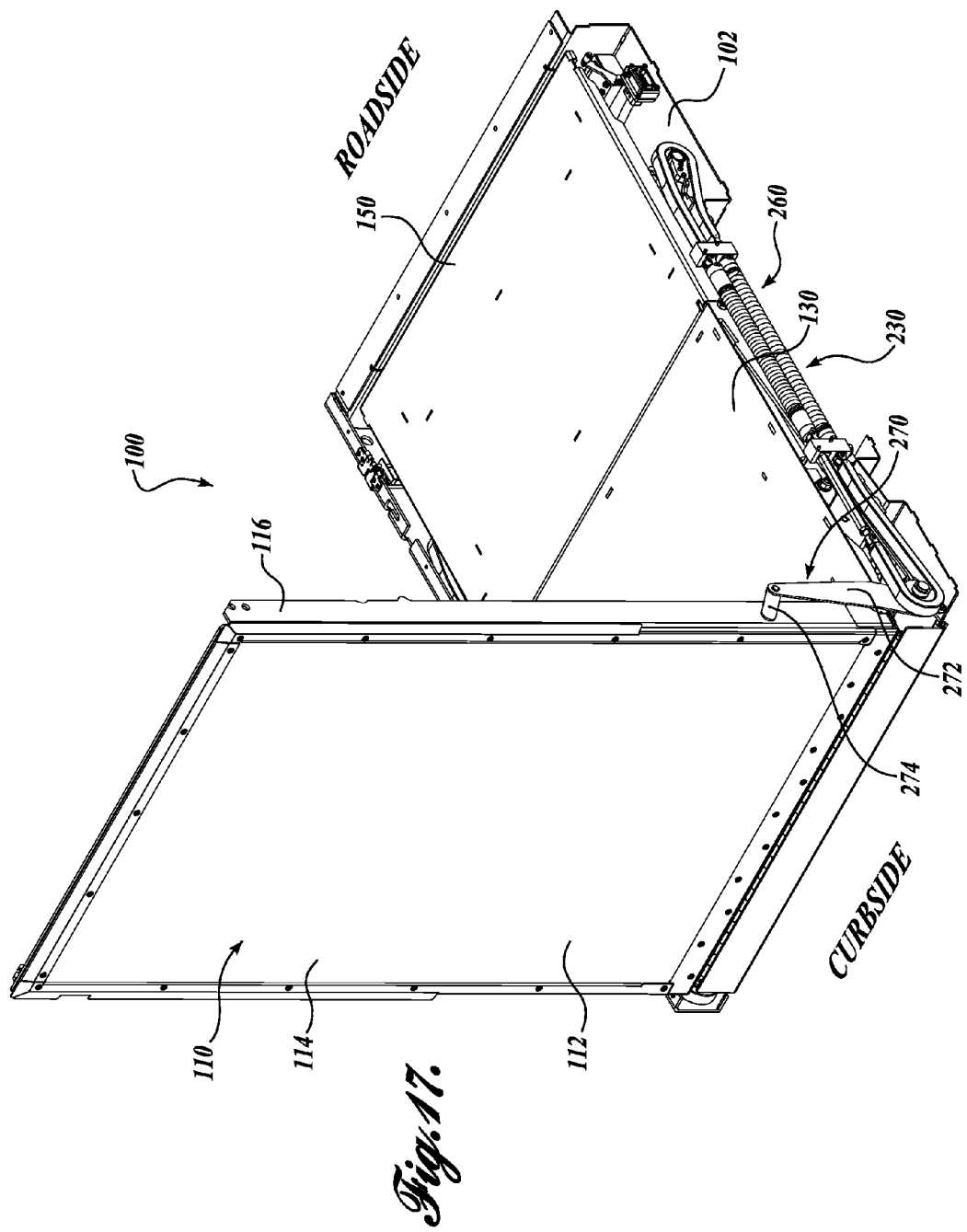

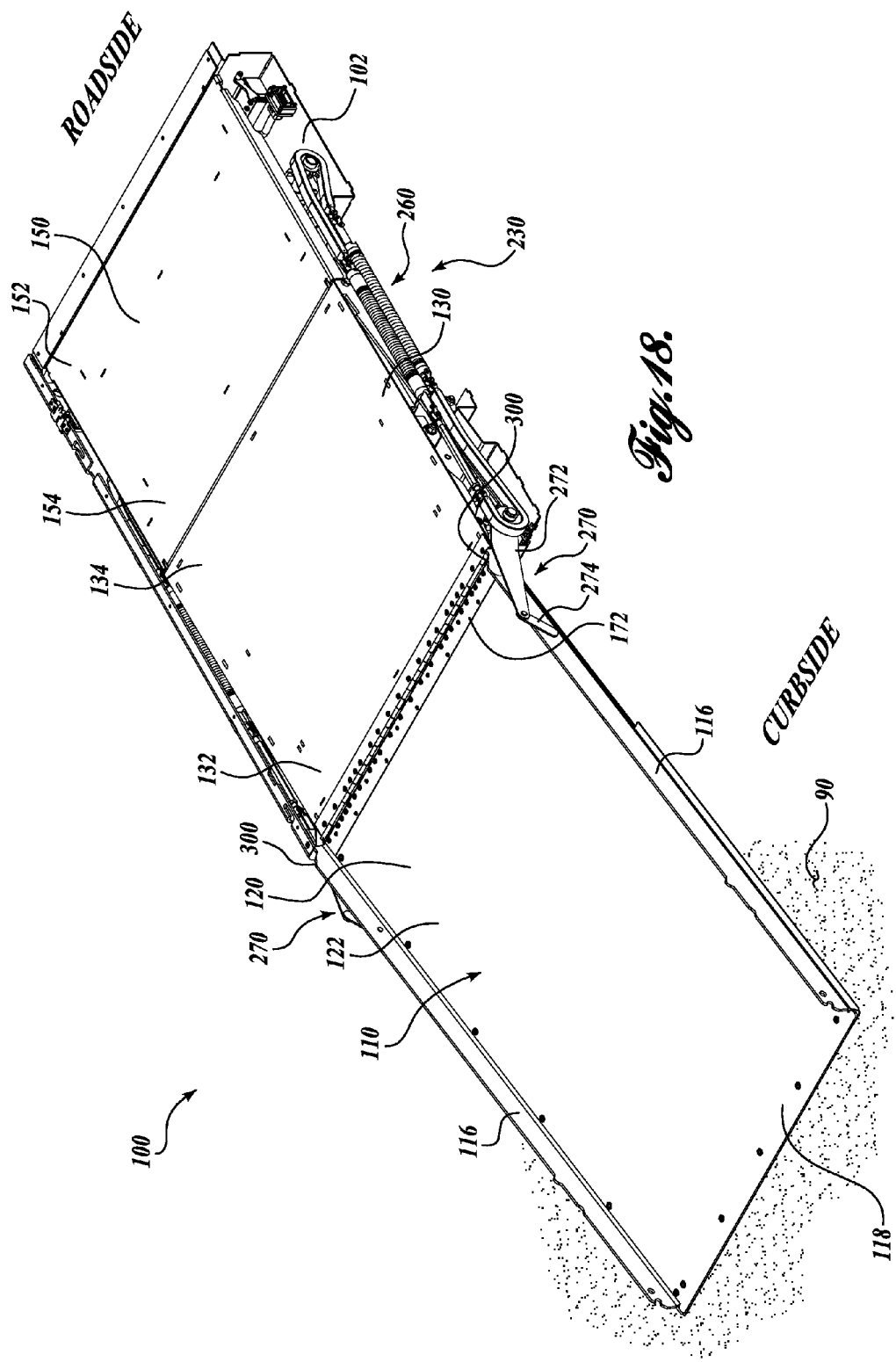

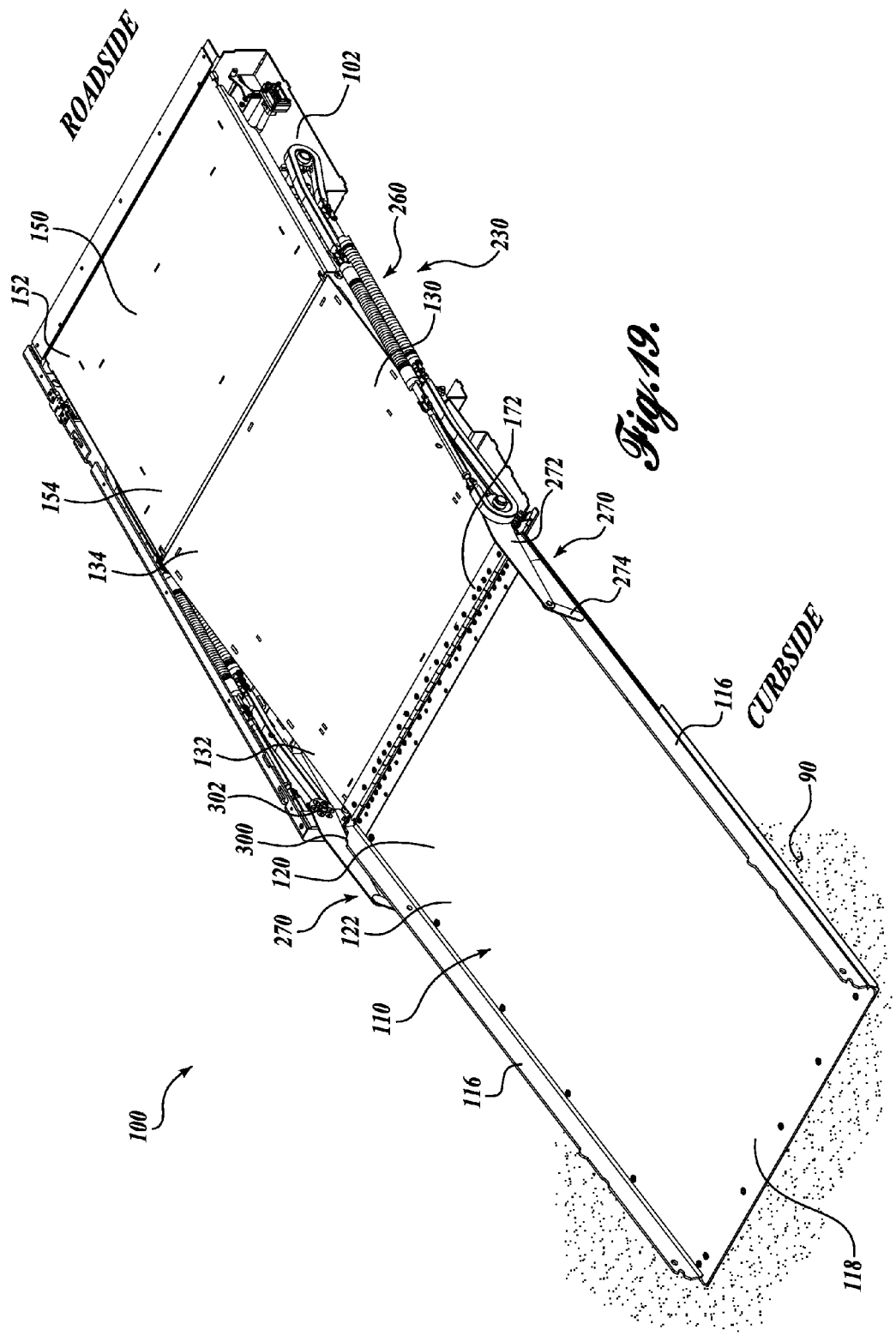

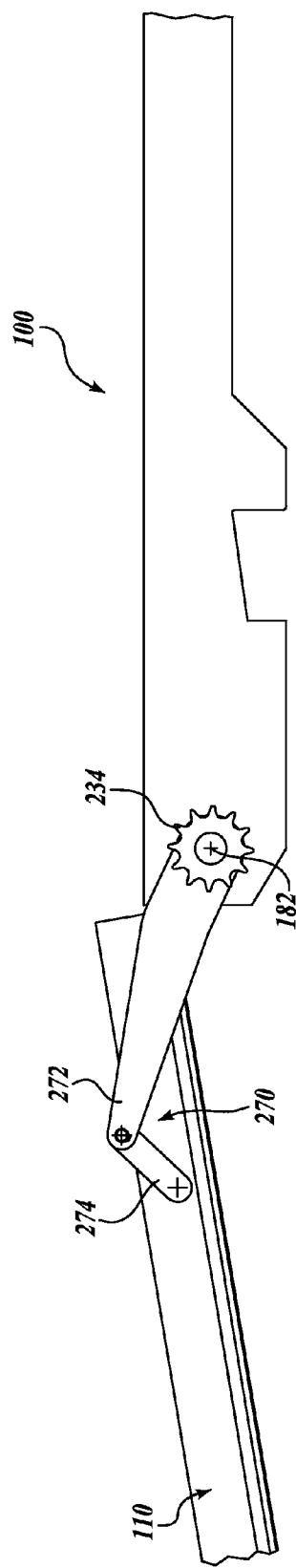
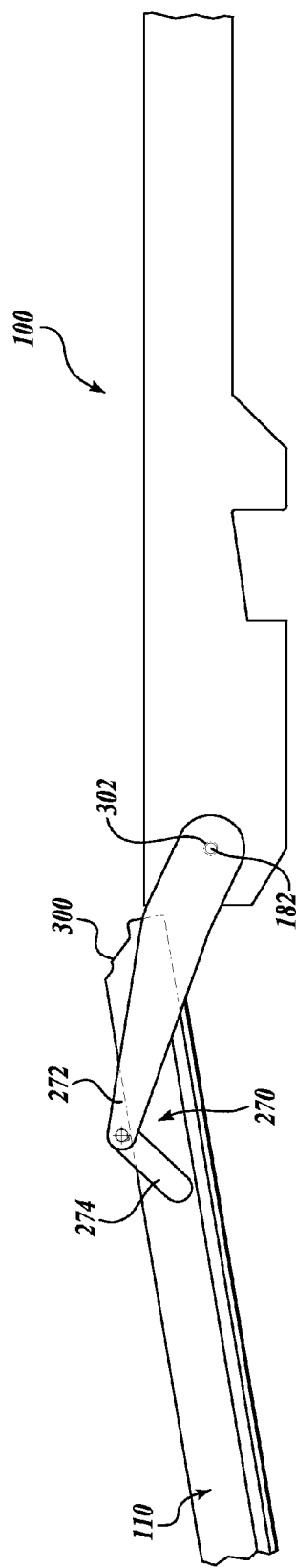

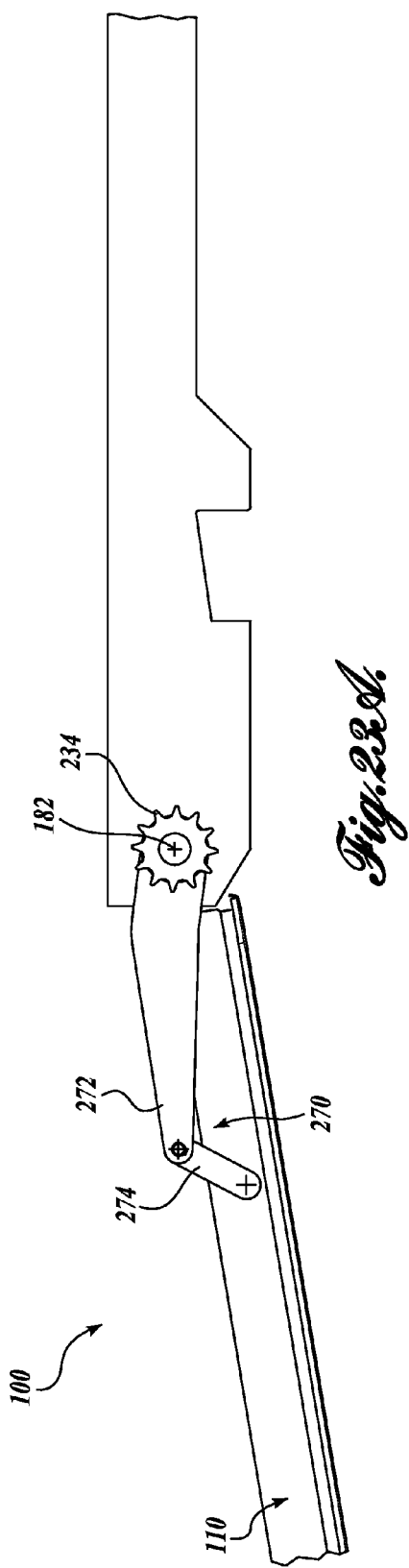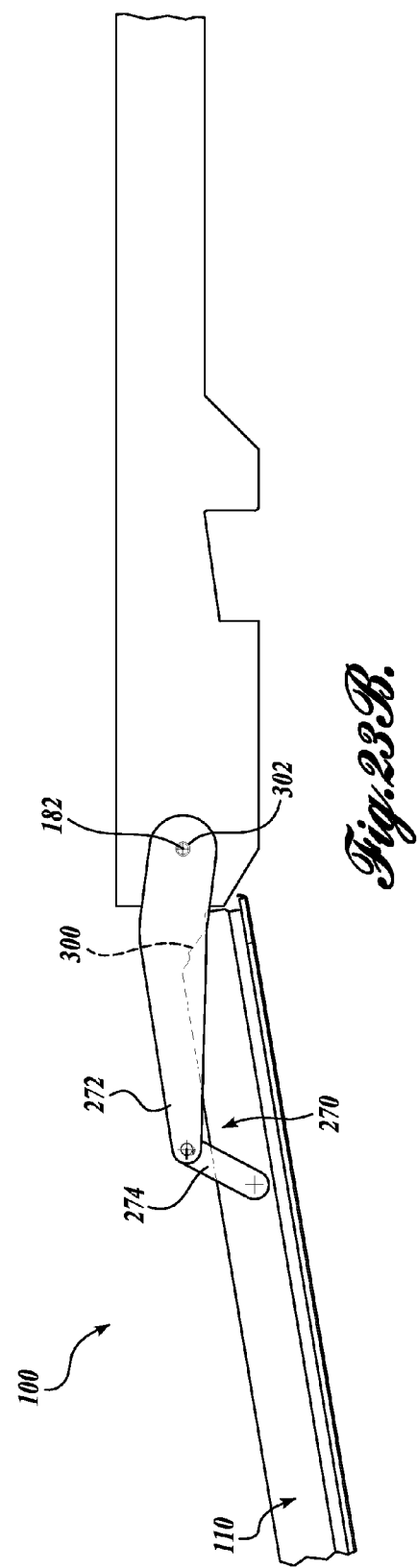

FOLD OUT RAMP

CROSS-REFERENCES TO RELATED APPLICATIONS

This is a continuation of U.S. patent application Ser. No. 13/454,858, filed on Apr. 24, 2012, which is a continuation-in-part of U.S. patent application Ser. No. 13/350,642, filed Jan. 13, 2012, and issued as U.S. Pat. No. 8,250,693 on Aug. 28, 2012, which is a continuation-in-part of U.S. patent application Ser. No. 13/015,439, filed Jan. 27, 2011, and issued as U.S. Pat. No. 8,132,281 on Mar. 13, 2012, the disclosures of which are expressly incorporated by reference. U.S. patent application Ser. No. 13/454,858 also claims the benefit of U.S. Provisional Application No. 61/596,117, filed Feb. 7, 2012, the disclosure of which is expressly incorporated by reference.

BACKGROUND OF THE INVENTION

The Americans with Disabilities Act (ADA) requires the removal of physical obstacles to those who are physically challenged. The stated objective of this legislation has increased public awareness and concern over the requirements of the physically challenged. Consequentially, there has been more emphasis on providing systems that enable physically challenged people to access a motor vehicle, such as a bus or minivan.

A common manner of providing the physically challenged with access to motor vehicles is a ramp. Various ramp operating systems for motor vehicles are known in the art. Some slide out from underneath the floor of the vehicle and tilt down. Others are stowed in a vertical position and pivot about a hinge, while still others are supported by booms and cable assemblies. The present invention is generally directed to a "fold out" type of ramp. Such a ramp is normally stowed in a horizontal position within a recess in the vehicle floor, and is pivoted upward and outward to a downward-sloping extended position. In the extended position, the ramp is adjustable to varying curb heights.

Fold out ramps on vehicles confront a variety of technical problems. Longer ramps are desirable because the resulting slope is more gradual and more accessible by wheelchair-bound passengers. Longer ramps are, however, heavier and require more torque about the pivot axis to be reciprocated between deployed and stowed positions. To satisfy the increased torque requirement, some fold out ramps use large electric motors, pneumatic devices, or hydraulic actuators to deploy and stow the ramp. Often, these systems cannot be moved manually in the event of failure of the power source, unless the drive mechanism is first disengaged. Some existing fold out ramps can be deployed or stowed manually, but they are difficult to operate because one must first overcome the resistance of the drive mechanism. Further, fold out ramps require a depression (or pocket) in the vehicle's vestibule floor in which to store the retracted/stowed ramp. When the ramp is deployed, the aforementioned depression presents an obstacle for wheelchair passengers as they transition from the ramp to the vestibule, and into the vehicle.

Another technical issue confronting fold out ramps is the variety of situations in which the ramps must operate. Depending on the use of the vehicle in which a particular ramp is installed, the ramp might be deployed to curbs of varying heights, as well as to a road surface. In addition, road crown, the inclusion of a "kneeling" feature on the vehicle, and other factors can affect the height of the vehicle floor relative to the alighting surface. Thus, the vertical distance though which a ramp must provide a transition surface can vary significantly.

In view of the foregoing, there is a need for a fold out ramp for a vehicle that provides a longer ramp surface to reduce the ramp angle in a variety of situations, and comprises an interior surface coplanar with the adjacent vehicle floor, and further includes a compact and efficient operating system.

SUMMARY

Various embodiments of a ramp assembly for providing a transition surface between a vehicle floor and an alighting surface are disclosed. In a first embodiment, the ramp assembly comprises a ramp portion coupled for reciprocating movement between a stowed position and a deployed position. A cam surface is disposed on the ramp, and a cam follower engages the cam surface when the ramp portion is in the stowed position to support the ramp portion. The ramp assembly further includes a panel rotatably coupled about an axis to a first end of the ramp portion. An actuator rotates a drive arm to move the ramp portion through first and second phases of a deployment motion. During the first phase, the drive arm rotates the ramp portion about the axis, which maintains a substantially fixed position. During the second phase, the drive arm moves the axis in a downward direction.

A second disclosed embodiment of a ramp assembly includes a ramp portion coupled for rotational movement between a stowed position and a deployed position. The ramp portion has side curb with a cam surface disposed thereon. A panel is rotatably coupled to the ramp portion about a first axis. The ramp portion further includes an elongate drive arm operably coupled to the ramp portion and extending radially from a second axis. An actuator rotates the drive arm about the second axis to move the ramp portion through a deployment motion. The deployment motion has a first phase, during which the drive arm rotates the ramp portion about the first axis, and a second phase, during which the drive arm moves the first axis from a raised position to a lowered position. The ramp assembly also includes a cam follower that engages the cam surface when the ramp portion is in the stowed position to support the ramp portion.

In a third exemplary embodiment, a ramp assembly has a ramp portion coupled for rotational movement between a stowed position and a deployed position, wherein the ramp portion includes a cam surface. A first panel is rotatably coupled to the ramp portion about a first axis and is rotatably associated with a second panel. The second panel reciprocates between a lowered position when the ramp portion is in the stowed position, and a raised position when the ramp portion is in the deployed position. A cam follower engages the cam surface when the ramp portion is in the stowed position to support the ramp portion. The cam follower is disengaged from the cam surface when the ramp portion is in the deployed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a side view of the ramp assembly shown in FIG. 1, with the ramp portion in a first deployed position;

FIG. 8 is a side view of the ramp assembly shown in FIG. 1, with the ramp portion in a second deployed position;

FIG. 14 is a partial side view of the ramp assembly shown in FIG. 1, showing the drive arm when the ramp portion is in a first deployed position;

FIG. 15 is a partial side view of the ramp assembly shown in FIG. 1, showing the drive arm when the ramp portion is in a second deployed position;

FIG. 16 is an isometric view of a second exemplary embodiment of a ramp assembly with a ramp portion in the stowed position;

FIG. 17 is an isometric view of the ramp assembly shown in FIG. 16, with the ramp portion in a neutral position;

FIG. 18 is an isometric view of the ramp assembly shown in FIG. 16, with the ramp portion in a first deployed position;

FIG. 19 is an isometric view of the ramp assembly shown in FIG. 16, with the ramp portion in a second deployed position;

FIG. 22A is a partial side view of the ramp assembly shown in FIG. 16, showing the linkage when the ramp portion is in a first deployed position;

FIG. 22B is a partial side view of the ramp assembly shown in FIG. 16, showing the cam surface and cam follower when the ramp portion is in a first deployed position;

FIG. 23A is a partial side view of the ramp assembly shown in FIG. 16, showing the linkage when the ramp portion is in a second deployed position; and FIG. 23B is a partial side view of the ramp assembly shown in FIG. 16, showing the cam surface and cam follower when the ramp portion is in a second deployed position.

DETAILED DESCRIPTION

Exemplary embodiments of the disclosed fold out ramp will now be described with reference to the accompanying drawings, where like numerals correspond to like elements. The described embodiments are directed to ramp assemblies, and more specifically, wheelchair ramp assemblies. In particular, several embodiments are directed to wheelchair ramp assemblies suitable for use in buses, vans, etc. Several embodiments of the present invention are directed to compact ramp assemblies for a vehicle that, when stowed, occupy a small amount of space within the vehicle floor, yet deploy to a length that effectively reduces the ramp slope encountered by the mobility impaired, thus facilitating greater independence and safety for wheelchair-bound passengers.

The following discussion proceeds with reference to examples of wheelchair ramp assemblies for use in vehicles having a floor, such as a bus, van, etc. While the examples provided herein have been described with reference to their association with vehicles, it will be apparent to one skilled in the art that this is done for illustrative purposes and should not be construed as limiting the scope of the disclosed subject matter, as claimed. Thus, it will be apparent to one skilled in the art that aspects of the disclosed fold out ramp may be employed with other ramp assemblies used in stationary installations, such as residential buildings and the like. The following detailed description may use illustrative terms such as vertical, horizontal, front, rear, curbside (inboard), roadside (outboard), inner, proximal, distal, etc.; however, these terms are descriptive in nature and should not be construed as limiting. Further, it will be appreciated that various embodiments of the disclosed fold out ramp may employ any combination of features described herein.

Figure 1:
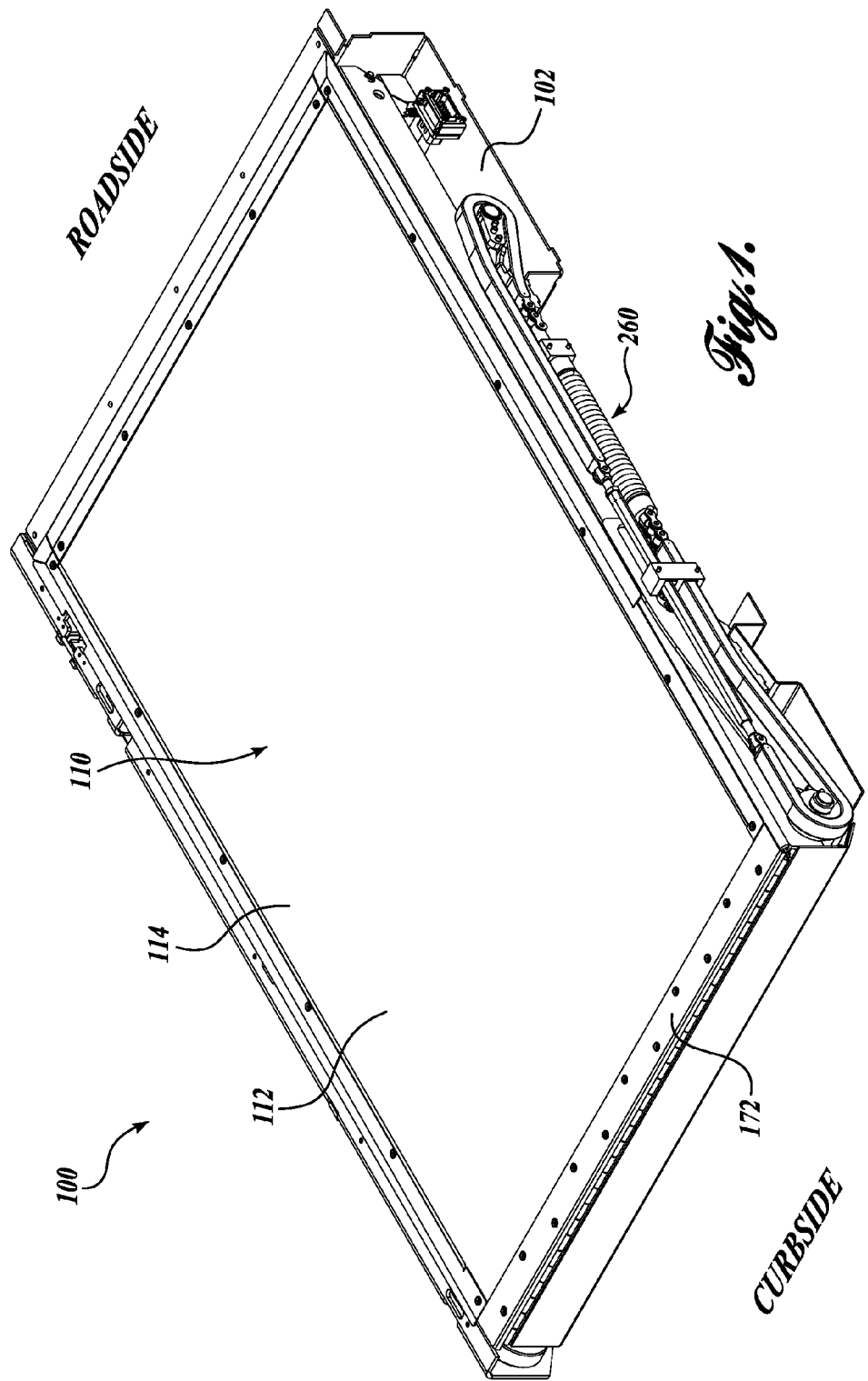
FIG. 1 is an isometric view of an exemplary embodiment of a ramp assembly with a ramp portion in the stowed position.
Figure 2:
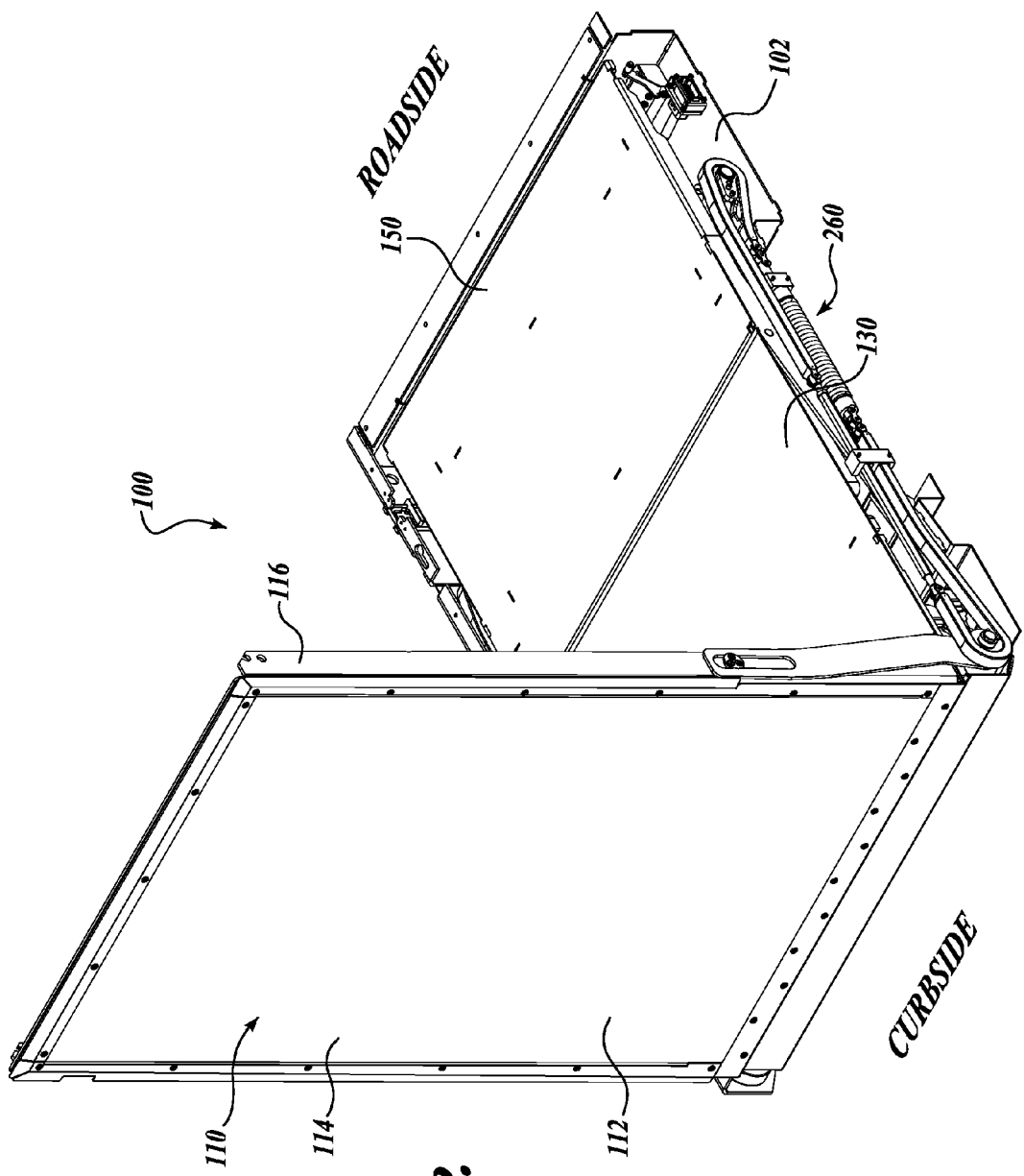
FIG. 2 is an isometric view of the ramp assembly shown in FIG. 1, with the ramp portion in a neutral position.
Figure 3:
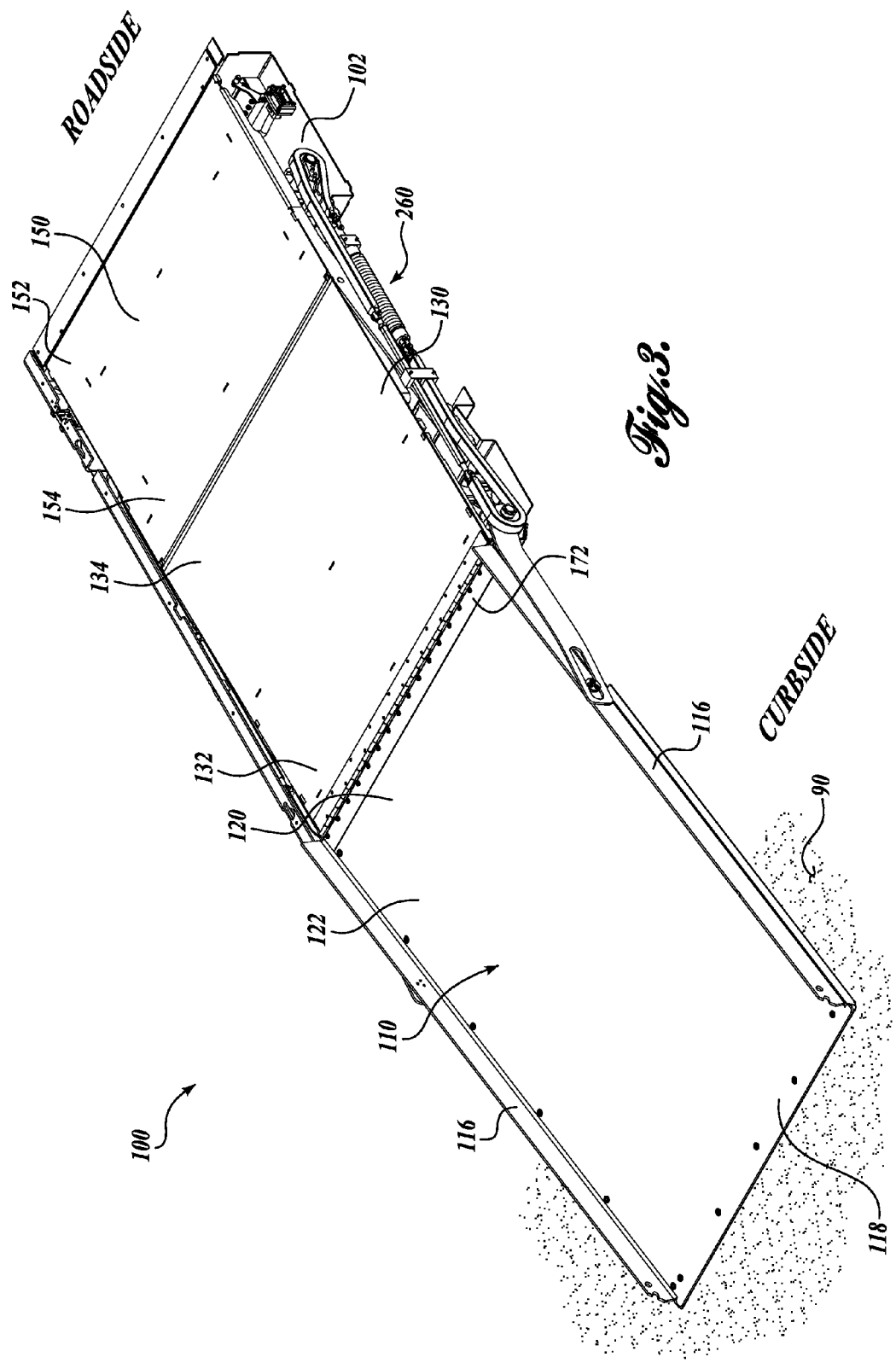
FIG. 3 is an isometric view of the ramp assembly shown in FIG. 1, with the ramp portion in a first deployed position.
Figure 4:
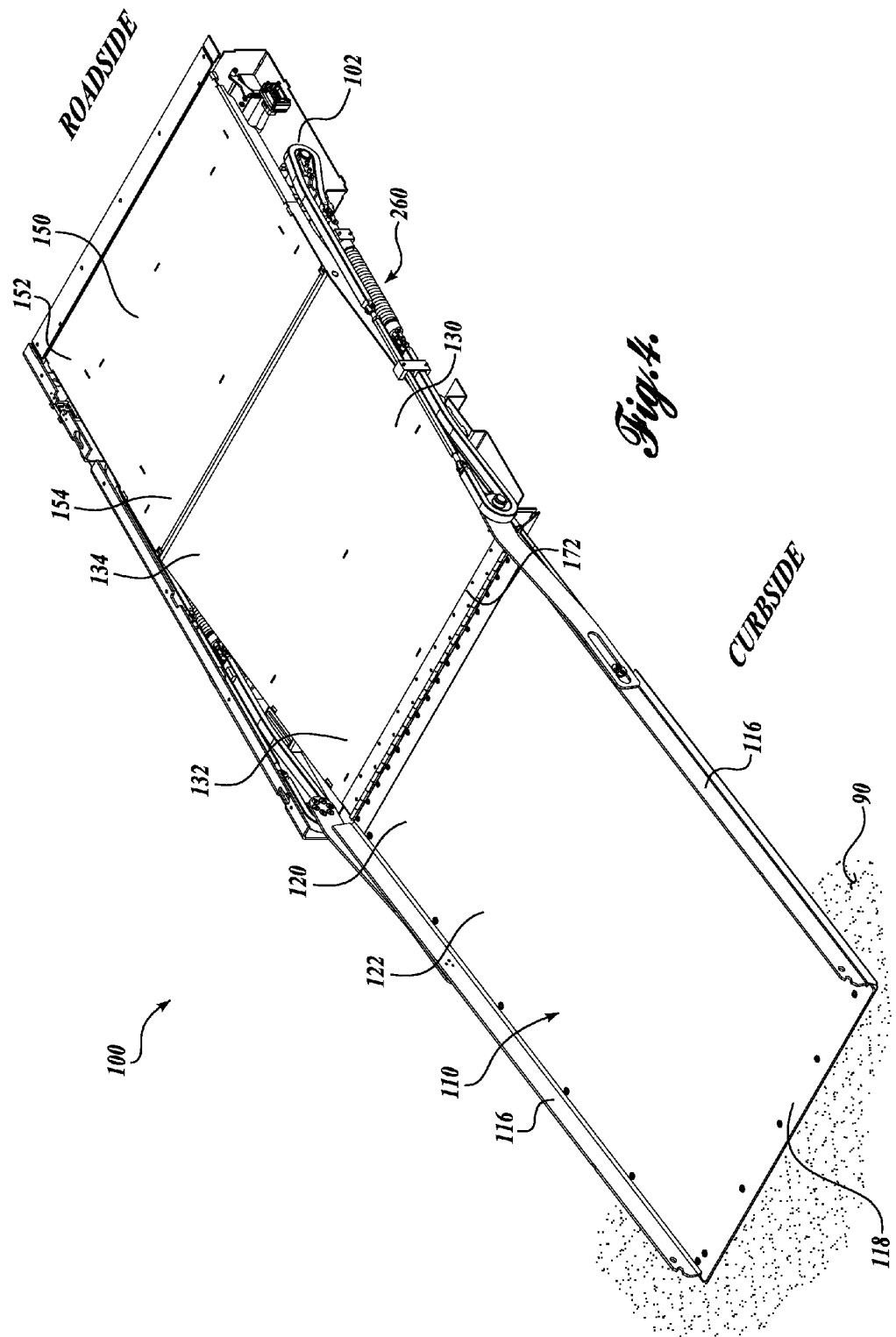
FIG. 4 is an isometric view of the ramp assembly shown in FIG. 1, with the ramp portion in a second deployed position.

FIGS. 1-4 illustrate one exemplary embodiment of a fold out ramp assembly 100 (hereinafter "ramp assembly 100") as it moves from a stowed position (FIG. 1) through a neutral position (FIG. 2), and a first deployed position (FIG. 3) to a second deployed position (FIG. 4). The ramp assembly 100 includes a frame 102, a ramp portion 110, an intermediate panel 130, and an inner panel 150. The frame 102 of the ramp assembly 100 is adapted to be mounted to a vehicle (not shown) having a floor, such as a bus or a van. The ramp assembly 100 is reciprocal between the stowed position, shown in FIG. 1, and various deployed positions, such as the ones shown in FIGS. 3 and 4. In the stowed position, the ramp portion 110 is located such that the ramp is disposed over the intermediate panel 130 and the inner panel 150, and the lower surface 112 of the ramp portion faces upward and is substantially coplanar, i.e., flush, with the floor (not shown) of the vehicle. In a deployed position, the ramp portion 110 extends in a curbside and downward direction to contact an alighting surface 90, such as a curb or road surface, thus cooperating with the intermediate panel 130 and inner panel 150 to provide a transition between the vehicle and the alighting surface 90.

Although the illustrated embodiments of the ramp assembly 100 include a frame 102, other embodiments are contemplated in which the ramp assembly 100 does not include a frame. To install such embodiments in vehicles, the ramp assembly 100 components can be attached directly to the structure of the vehicle or to a suitable structure within the vehicle, thus making a frame 102 unnecessary. Similarly, when such embodiments are installed in stationary installations, such as residential buildings and the like, the ramp assembly 100 components can be attached to the structure of the building or any other suitable structure within the building. Accordingly, embodiments of the described ramp assembly 100 that do not include a frame should be considered within the scope of the present disclosure.

Still referring to FIGS. 1-4, the ramp portion 110 includes a panel 114 constructed from well-known materials. The ramp portion 110 further includes side curbs 116 that extend upwardly from the forward and rear sides of the panel 114. The side curbs 116 increase the strength of the ramp portion 110 and provide edge guards for the sides of the ramp portion 110, thereby increasing the overall safety of the ramp assembly 100. In the illustrated embodiment, the curbside end 118 of the ramp portion 110 (when the ramp is in a deployed position) is tapered to provide a smooth transition between the panel 114 and the alighting surface 90 when the ramp assembly 100 is in a deployed position, although such a feature may not be necessary, depending on the thickness of the ramp.

As shown in FIGS. 1-8, the ramp portion 110 is rotatably connected at the roadside end 120 (when the ramp portion is in a deployed position) to the curbside end 132 of the intermediate panel 130 about an axis 170. Referring back to FIG. 3, the ramp portion 110 and the intermediate panel 130 of the illustrated ramp assembly 100 are connected with a single continuous hinge 172 i.e., a "piano hinge," however, it will be appreciated that multiple hinges or any other configuration suitable for rotatably connecting the ramp portion 110 to the intermediate panel 130 and/or maintaining a rotational association therebetween can be utilized.

The axis 170 maintains a generally horizontal orientation so that the ramp portion 110 is rotatable about the axis to reciprocate between the stowed position and the deployed positions. In the stowed position, shown in FIG. 1, the ramp portion 110 extends inwardly from the axis 170 such that the ramp is at least partially disposed over the intermediate panel 130 and the inner panel 150. When in the stowed position, the lower surface 112 of the ramp panel 114 faces upward and is oriented to be generally flush with the vehicle floor, thereby providing a surface upon which able-bodied passengers can walk while entering and exiting the vehicle. When the ramp portion 110 is in a deployed position, such as the one shown in FIG. 4, the ramp extends in an outward and downward direction so that the upper surface 122 of the panel 114 faces up and provides an inclined transition surface from the intermediate panel 130 to the alighting surface 90.

Referring now to FIGS. 5-8, the inner panel 150 is configured to reciprocate between a lowered position (FIG. 5), when the ramp assembly 100 is in the stowed position and a raised position (FIG. 8), when the ramp assembly is in a deployed position. In the disclosed embodiment, the inner panel 150 is supported by an inner panel support 156 disposed beneath the inner panel. The inner panel support 156 includes a plurality of elongate members 158, each elongate member having a roadside end 160 and a curbside end 162. The roadside end 160 of each elongate member 158 forms an angle with the curbside end 162 of that elongate member that approximates the angle between the inner panel 150, and the intermediate panel 130 when the ramp assembly 100 is in a deployed position.

The inner panel support 156 is configured for rotating movement at the curbside end about an axis 176. In the illustrated embodiment, the curbside end 162 of each of the elongate members 158 is rotatably connected to the frame 102; however, any portion of the inner panel support can be coupled to any suitable structure to enable reciprocating movement of the inner panel 150 between the raised position and the lowered position.

The roadside end of the inner panel support 156 supports the inner panel 150 and is itself supported by a selectively rotatably eccentric bearing element 164. A bearing surface 166 is disposed on a lower portion of the inner panel support 156 to engage the eccentric bearing element 164. As the eccentric bearing element 164 is selectively rotated about its axis 180, the bearing element engages the bearing surface 166 to raise and lower the roadside end on the inner panel support 156.

Figure 5:
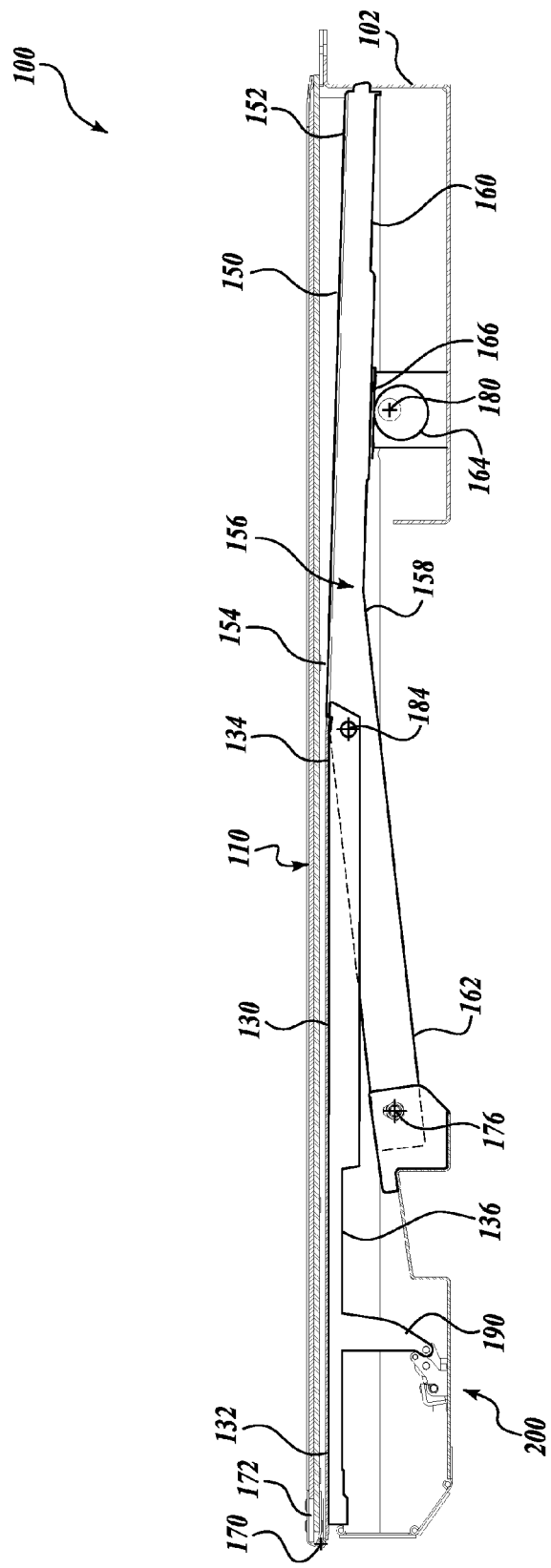
FIG. 5 is a side view of the ramp assembly shown in FIG. 1, with the ramp portion in the stowed position.
Figure 6:
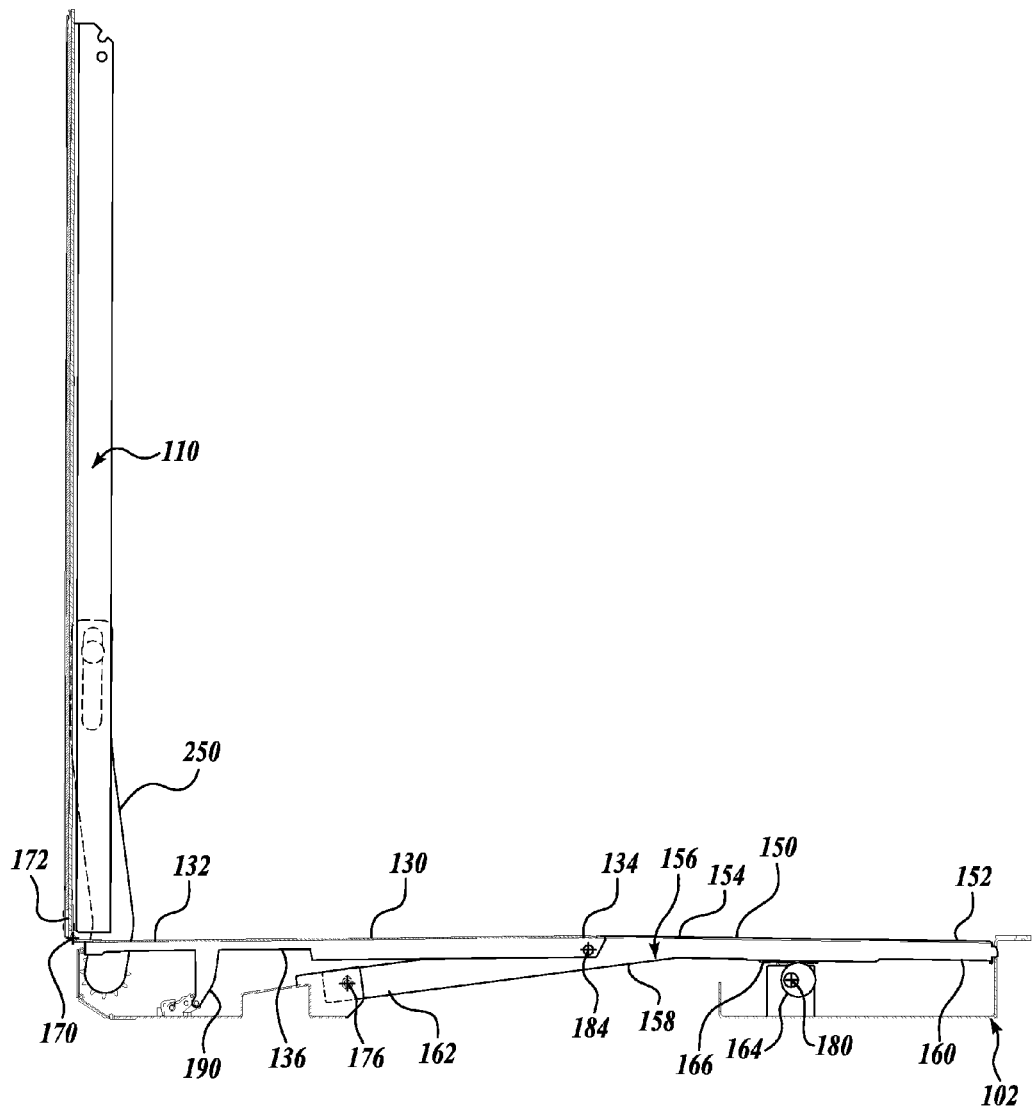
FIG. 6 is a side view of the ramp assembly shown in FIG. 1, with the ramp portion in a neutral position.

As shown in FIG. 5, when the ramp assembly 100 is in the stowed position, the eccentric bearing element 164 is in a first position, wherein the inner panel support 156 is in a lowered position, and the inner panel 150 is disposed within the frame 102 and positioned below the ramp portion 110. As the ramp assembly 100 moves toward a deployed position, the eccentric bearing element 164 rotates to lift the roadside end of the inner panel support 156, thereby rotating the inner panel 150 about axis 176 to a raised position. When the inner panel 150 is in the raised position, the upper surface of the inner panel is generally horizontal and coplanar, i.e., flush, with the vehicle floor. When the ramp assembly moves from a deployed position to the stowed position, the eccentric bearing element 164 rotates back to the first position, thereby lowering the inner panel 150.

It should be appreciated that the illustrated mechanism for raising and lowering the inner panel 150 is exemplary and that alternative configurations are possible. In this regard, the number and locations of the eccentric bearing elements 164 can vary. Further, the profile of the cam surface of the eccentric bearing element 164 can be modified to change the movement of the inner panel as the ramp assembly 100 reciprocates between the stowed and deployed positions. It should also be appreciated that the mechanisms are not limited to eccentric bearings and cams, but can also include any number of different linkages. In one non-limiting example, a four-bar linkage is coupled to one or more inner panel supports 156 to raise and lower the inner panel 150. In another contemplated embodiment, one or more pins extend laterally from one or more rotatable links to support the inner panel supports. Rotation of the links moves the pins along an arcuate path to raise and lower the inner panel. While the described configurations are all adaptable to be driven by the drive assembly 230 described below, alternative configurations in which a separate actuator raises and lowers the inner panel 150 are also possible. These and other suitable configurations for raising and lowering the inner panel 150 are contemplated and should be considered within the scope of the present disclosure.

As shown in FIGS. 5-8, the intermediate panel 130 is constructed from well-known materials, and has an upper surface suitable for providing a transition surface from the inner panel 150 to the ramp portion 110 when the ramp assembly 100 is in a deployed position. As previously noted, the curbside end 132 of the intermediate panel 130 is rotatably connected to the ramp portion 110 about axis 170. The roadside end 134 of the intermediate ramp 130 is rotatably associated with the curbside end 154 of the inner panel 150.

In the illustrated embodiment, the intermediate panel 130 is supported by an intermediate panel support 136 disposed beneath the intermediate panel. The roadside end of the intermediate panel support 136 is rotatably coupled to the inner panel support 156 about an axis 184 so that as the ramp assembly 100 reciprocates between the stowed position and a deployed position, the angle between the upper surface of the inner panel 150 and the upper surface of the intermediate panel 130 changes. In an alternate embodiment, the roadside end 134 of the intermediate panel 130 is coupled directly to the curbside end 154 of the inner panel 150 with a continuous hinge, or series of hinges. These, and other suitable configurations for establishing a rotational relationship between the inner panel 150 and the intermediate panel 130, are contemplated and should be considered within the scope of the present disclosure.

Still referring to FIGS. 5-8, the intermediate panel support 136 includes a support member 190 extending downwardly from the curbside end of the intermediate panel support. During a first phase of deployment (FIGS. 5-7) the support member 190 selectively engages a latch mechanism 200 (FIG. 11) that is fixedly positioned relative to the frame 102. When the support member 190 is so engaged, the support member maintains the axis 170 about which the ramp portion 110 is connected to the intermediate panel 130 in a substantially fixed location. Although the axis 170 is maintained in a substantially fixed position, it will be appreciated that the axis 170 does move slightly as the intermediate panel 130 moves in response to the movement of the inner panel 150 between the raised and lowered positions.

During a second phase of deployment (FIGS. 7-8), the latch mechanism 200 selectively disengages the support member 190. With the support member 190 disengaged from the latch mechanism 200, continued actuation of the ramp portion 110 toward a deployed position rotates the ramp portion 110 about its curbside end 118. As a result, the axis 170 about which the ramp portion 110 is connected to the intermediate panel 130, moves in a downward direction until the intermediate panel reaches a predetermined position. In the predetermined position, the intermediate panel 130 is supported by the inner panel support 156. More specifically, when the intermediate panel 130 is in the predetermined position, the intermediate panel engages the elongate members 158 of the inner panel support 156. These portions of the inner panel support 156 maintain the intermediate panel 130 in the predetermined position when the ramp portion moves through the second phase of the deployment. It should be appreciated that the present disclosure is not limited to a particular configuration for maintaining the intermediate panel in a predetermined position. In this regard, any number and types of restraints and supports can be utilized to maintain the intermediate panel 130 in the predetermined position when the ramp portion is in a deployed position, and such alternate configurations should be considered within the scope of the present disclosure.

Figure 9:
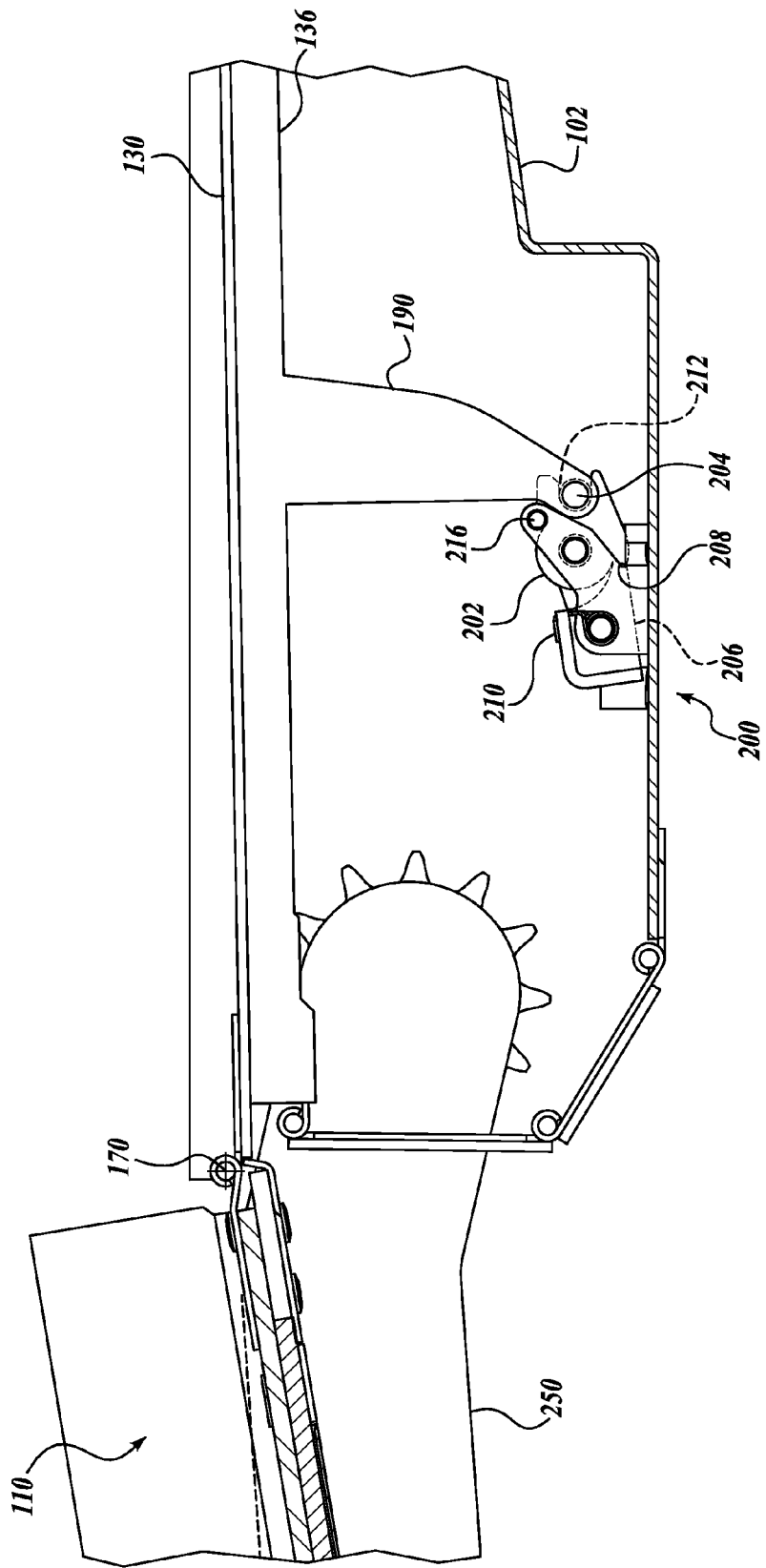
FIG. 9 is a partial cross-sectional view of the ramp assembly shown in FIG. 1, wherein a latch mechanism is shown with the ramp portion in a first deployed position.
Figure 10:
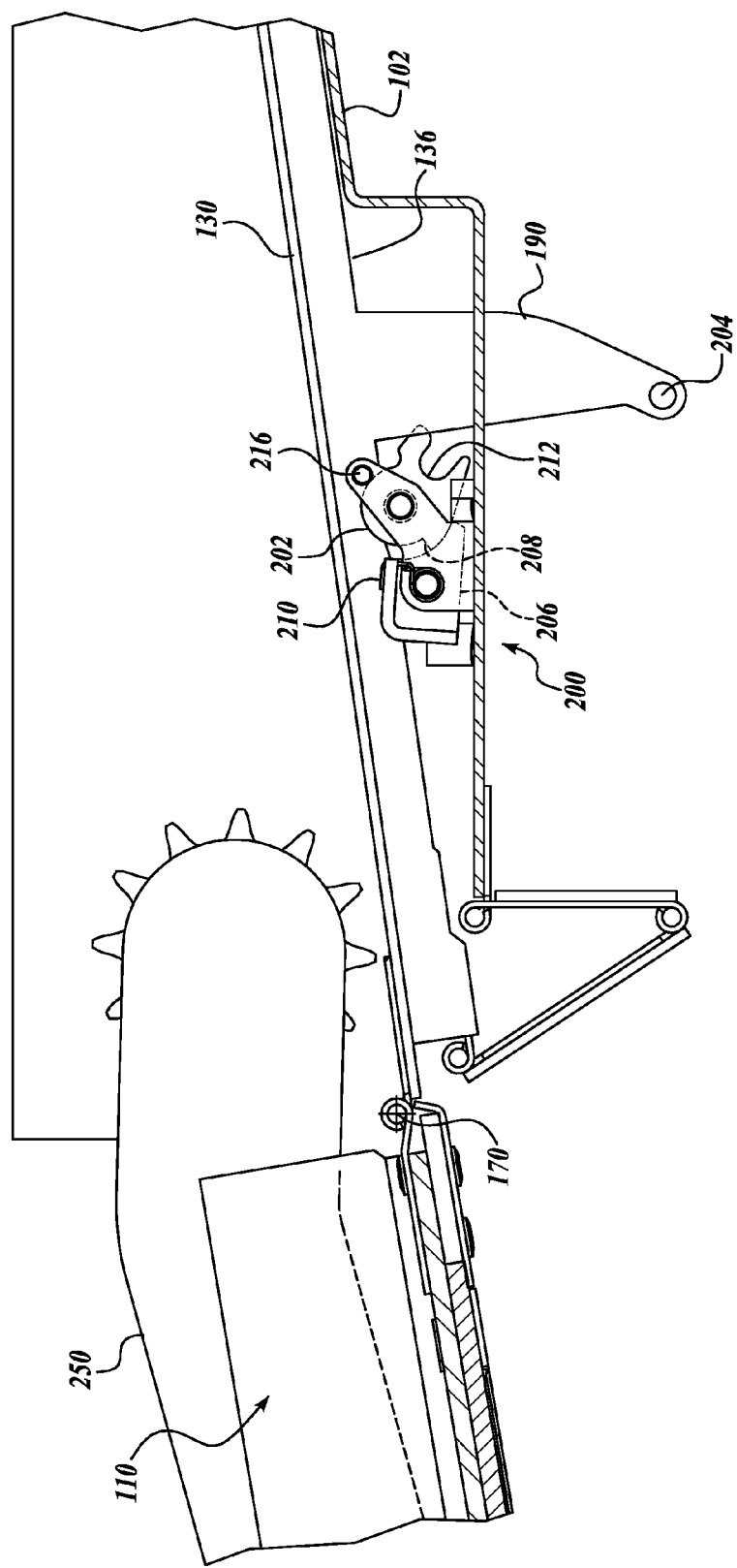
FIG. 10 is a partial cross-sectional view of the ramp assembly shown in FIG. 1, wherein a latch mechanism is shown with the ramp portion in a second deployed position.

Referring to FIGS. 9 and 10, one embodiment of a latch mechanism 200 is shown. The latch mechanism 200 includes a C-shaped catcher 202 rotatably coupled to the frame 102 to selectively retain a pin 204 that forms part of the support member 190. The catcher 202 is rotatable between an engaged position (FIG. 9) and a released position (FIG. 10). In the engaged position, the pin 204 is at least partially disposed within a recess 212 formed in the catcher 202.

The latch mechanism 200 further includes a pawl 206 to selectively engage a notch 208 formed in the catcher 202. As shown in FIGS. 9 and 10, the pawl 206 is rotatably coupled to the frame 102 proximate to the catcher 202 and is biased to contact the pawl by a spring 210. With the latch mechanism in the engaged position, the pawl 206 engages the notch 208 to prevent the catcher 202 from rotating toward the released position. At the same time, a pin 216 engages the catcher 202 to prevent further rotation away from the released position.

Thus, as shown in FIG. 9, the pin 216 and the pawl 206 cooperate to lock the catcher 202 in the engaged position.

To unlock the latch mechanism 200, an actuator 214 (FIG. 11), which is operably coupled to the pawl 206, temporarily rotates the pawl in a clockwise direction as viewed in FIGS. 9 and 10 so that the pawl disengages from the notch 208 formed in the catcher 202. With the pawl 206 disengaged from the notch 208, the catcher 202 is free to rotate toward the disengaged position, thereby releasing the support member 190. With the support member 190 released from the latch mechanism 200, the curbside end 132 of the intermediate panel 130 is free to move to a lowered position as the ramp assembly 110 moves through the second deployment phase. Once the catcher 202 has rotated to the disengaged position, the actuator 214 releases the pawl 206, and the spring 210 biases the pawl back to engage a side of the catcher. The pawl 206 remains in sliding contact with the catcher 202 until the catcher returns to the engaged position, at which time the pawl engages the notch 208 to lock the catcher in the engaged position.

Still referring to FIGS. 9 and 10, when the ramp assembly 100 moves from the deployed position toward the stowed position, movement of the ramp portion 110 drives the support member 190 upward so that the pin 204 engages the recess 212 in the catcher 202 to rotate the catcher 202 toward the engaged position. When the catcher 202 reaches the engaged position, pin 216 engages the catcher to prevent further rotation. At the same time, the spring-loaded pawl 206 rotates back to engage the notch 208 in the catcher 202, thereby locking the latch mechanism 200 in the engaged position. In this manner, the pin 216 and the pawl 206 cooperate to retain the catcher 202 in the engaged position, thereby maintaining the axis 170, about which the ramp portion 110 and intermediate panel 130 are connected, in a generally fixed position.

As previously described, the latch mechanism 200 maintains the axis 170 in a fixed position during the first deployment phase, and allows the axis 170 to move in a downward direction during the second deployment phase. It will be appreciated that other configurations to selectively maintain the location of the axis 170 are possible. In one alternate embodiment, the curbside end of the intermediate panel 130 is supported by a rotatable cam. The profile of the cam surface is such that as the ramp assembly 100 initially moves from the stowed position, the cam supports the intermediate panel 130 in a fixed position, i.e., the cam profile has a constant radius during the first deployment phase. As the ramp assembly 100 begins the second deployment phase, the cam surface disengages the intermediate panel so that the cam no longer supports the intermediate panel. As a result, the axis 170 is free to move in a downward direction during the second deployment phase, as described above.

In another contemplated embodiment, a Geneva drive is utilized to reciprocate one or more support elements between engaged and disengaged positions. During the first deployment phase, the support elements are in the engaged position and support the curbside end of the intermediate panel to maintain the axis 170 in a generally fixed position. During the second deployment phase, the support elements move to a disengaged position so that the axis 170 is free to move downward. The Geneva drive, which translates continuous rotation into intermittent rotary motion, allows for the support elements to be driven between two positions by the constant rotary motion provided by the drive assembly 230 described below. In this manner, the support elements are reciprocated between an engaged position (supporting the intermediate panel) and a disengaged position (not supporting the intermediate panel), wherein each position is generally fixed throughout the first and second deployment phases, respectively.

In yet another contemplated embodiment, a separate actuator reciprocates support elements between engaged and disengaged positions. The support elements operate in a similar manner to those described above in the embodiment that utilizes a Geneva drive; however, rather than utilize the rotary motion of the drive assembly 230 described below, a separate actuator drives the support elements between the engaged and disengaged positions. These and other configurations to selectively maintain the position of the axis 170 are contemplated and should be considered within the scope of the present disclosure.

Referring now to FIGS. 1-4, and 11, a drive assembly 230 actuates the ramp portion 110 to reciprocate between the stowed position and a deployed position. A forward portion of the drive assembly 230 is located on the forward side of the frame 102, and a rear portion of the drive assembly is similarly located on the rear side of the frame 102, wherein each element of the forward portion of the drive assembly 230 corresponds to a similar element of the rear portion of the drive assembly. For the sake of clarity, the forward portion of the drive assembly 230 is described herein with the understanding that unless otherwise indicated, each element of the forward portion has a corresponding element on the rear portion of the drive assembly 230.

Figure 11:
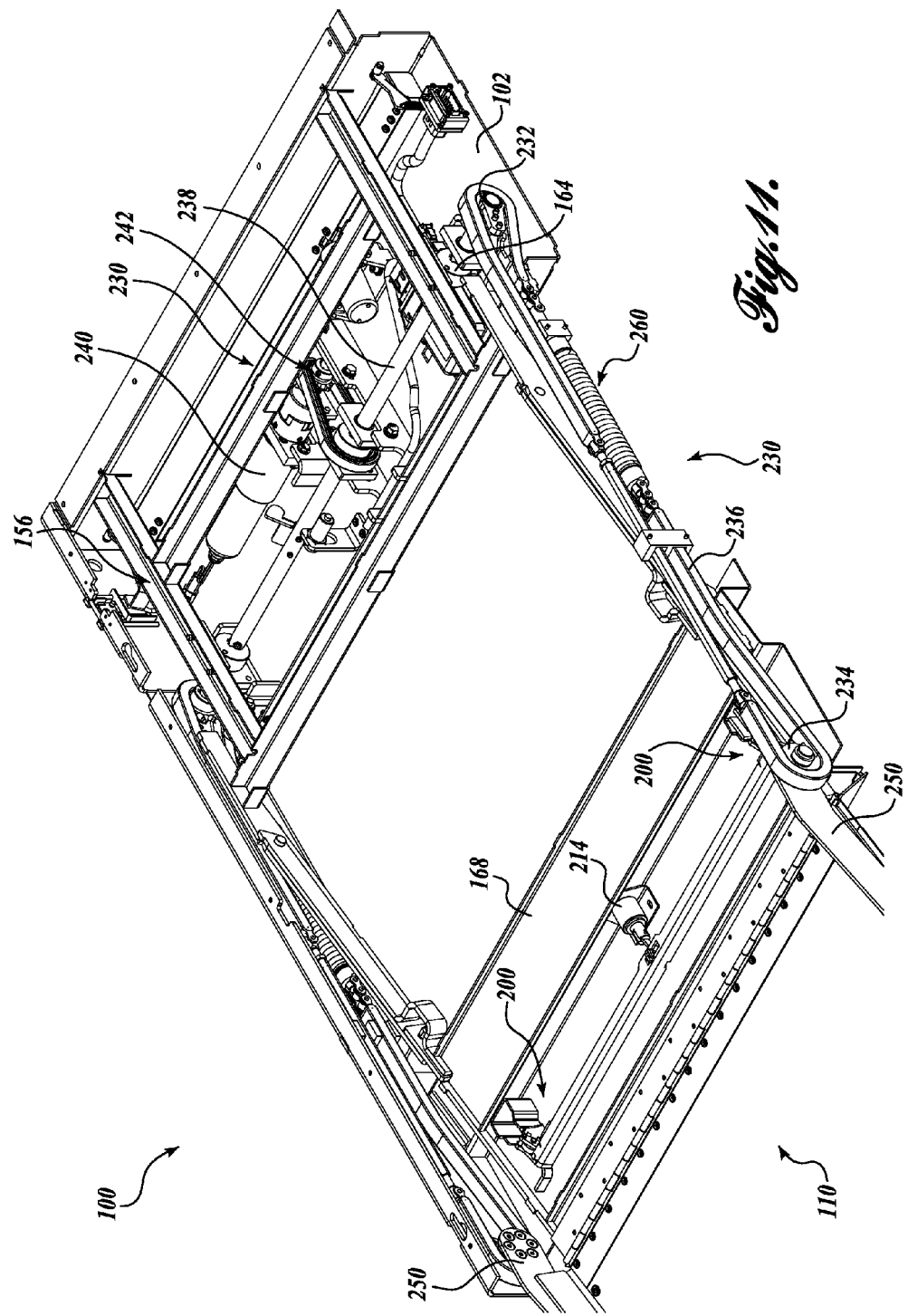
FIG. 11 is partial isometric view of the ramp assembly shown in FIG. 1, with an intermediate panel and an inner panel removed.
Figure 12:
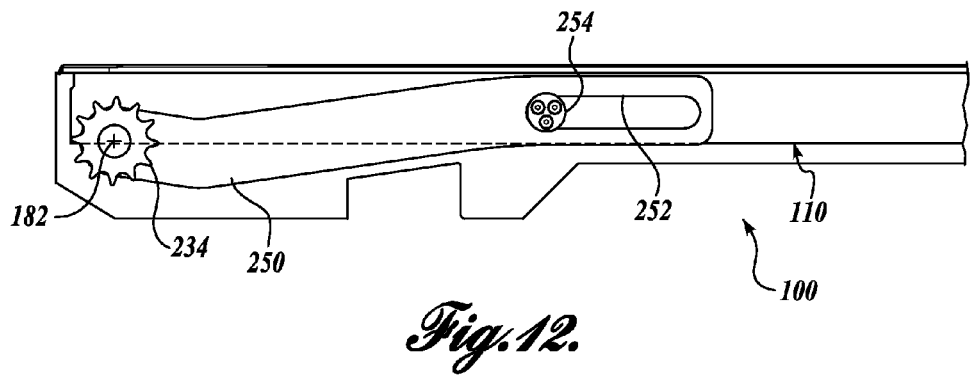
FIG. 12 is a partial side view of the ramp assembly shown in FIG. 1, showing a drive arm when the ramp portion is in the stowed position.
Figure 13:
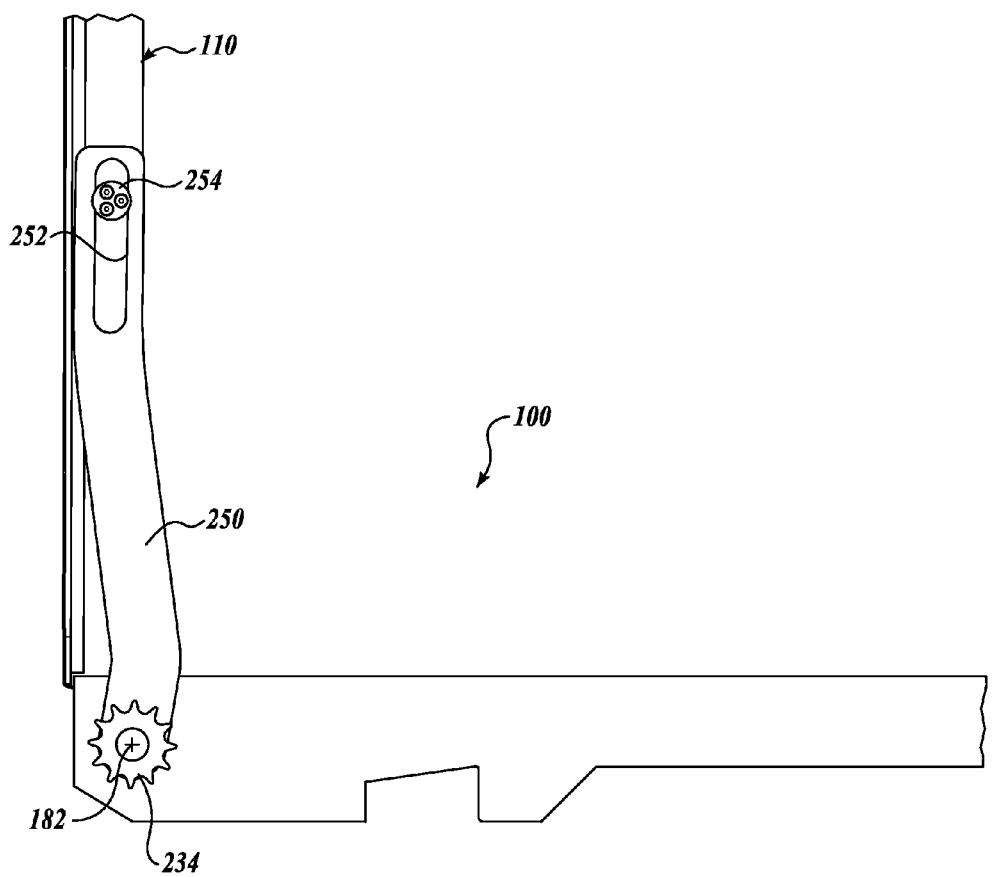
FIG. 13 is a partial side view of the ramp assembly shown in FIG. 1, showing the drive arm when the ramp portion is in a neutral position.

As shown in FIG. 11, the drive assembly 230 includes a roadside sprocket 232 that is rotatably coupled to the roadside end of the forward side of the frame 102, so that the axis of rotation of the roadside sprocket 232 extends in the forward/rearward direction. The drive assembly 230 also includes a curbside sprocket 234 that is rotatably coupled to the curbside end of the forward side of the frame 102 to have an axis of rotation that is substantially parallel to the axis of rotation of the roadside sprocket 232. A drive chain assembly 236 forms an endless loop that engages the teeth of the curbside sprocket 234 and the teeth of the roadside sprocket 232. As a result, movement of the drive chain assembly 236 along the path of the endless loop rotates the roadside sprocket 232 and the curbside sprocket 234.

A drive shaft 238 is coupled to the roadside sprocket 232 and also to a motor 240 (rotary actuator) by a well-known transmission assembly 242. The motor 240 is selectively operated to rotate the roadside sprocket 232, thereby moving the roadside sprocket 232 and the curbside sprocket 234 via the drive chain assembly 236. In one embodiment, a single motor 240 drives the roadside sprocket 232 of the forward portion of the drive assembly 230 and also the drive sprocket of the rear portion of the drive assembly 230. In another embodiment, each roadside sprocket 232 is driven by a separate motor 240. In other alternate embodiments, the drive shaft 238 connects the motor 240 to the curbside sprocket 234, or to a separate drive sprocket that engages the drive chain assembly 236.

One or more idler sprockets may be included in the drive assembly 230. The optional idler sprockets engage the drive chain assembly 236 to redirect the drive chain assembly 236 along a predetermined path. In one embodiment, the drive chain assembly 236 includes a turnbuckle that is selectively adjustable to increase or decrease the length of the drive chain assembly 236 in order to adjust the tension of the drive chain assembly.

It should be appreciated that the present disclosure is not limited to the illustrated motor, which is shown as providing a rotary output, but can incorporate several other types of actuators. In one alternate embodiment, a linear actuator is utilized to drive the ramp assembly between the stowed and deployed positions. For such an embodiment, a suitable mechanism for converting linear motion into rotary motion is utilized. Non-limiting examples of such a mechanism include a rack and pinion system and a linkage. Further, the present disclosure is not limited to electric motors (actuators), but can also include hydraulic systems or any other suitable mechanism for providing a driving force to reciprocate the ramp assembly between the stowed and deployed positions.

As illustrated in FIGS. 12-15, a drive arm 250 is fixedly coupled to extend radially from the curbside sprocket 234. The drive arm 250 includes an elongate slot 252 formed therein. A bearing element 254 is coupled to the ramp portion and is at least partially disposed within the slot 252. As the drive assembly rotates the curbside sprocket 234, the drive arm 250 engages the bearing element 254 to apply a moment to the ramp portion, thereby driving the ramp portion between the stowed position (FIG. 12) and a deployed position (FIG. 15).

The slot 252 and bearing element 254 configuration allows the drive arm 250 to drive the ramp portion 110 even though the axis of rotation 170 of the ramp portion is not coincident with the axis of rotation 182 of the drive arm 250. Moreover, this configuration allows for the relative positions of the axes 170 and 182 to change as the ramp assembly 100 moves through the first and second deployment phases. It should be appreciated that alternate configurations for engaging the drive arm 250 with the ramp portion 110 are possible. In one alternate embodiment, the bearing element is disposed on the drive arm 250 and engages a slot formed in the ramp portion. This and other alternate embodiments suitable for coupling the drive arm 250 to the ramp portion to drive the ramp portion between the stowed position and a deployed position are contemplated and should be considered within the scope of the present disclosure.

As shown in FIG. 11, the eccentric bearing element 164 is coupled to the drive shaft 238 so that rotation of the drive shaft rotates the eccentric bearing element 164 to raise and lower the roadside end 152 of the inner panel 150. As a result, rotation of the drive shaft 238 moves both the eccentric bearing element 164 and the drive arm 250 so that movement of the inner panel 150 and the ramp portion 110 are synchronized.

Referring to FIGS. 1-4, the drive assembly 230 further includes a counterbalance assembly 260. The counterbalance assembly 260 can be any known counterbalance assembly that biases the ramp portion toward the neutral position, i.e., a position wherein the center of gravity of the ramp portion 110 is located above the axis of rotation 170 of the ramp portion, so that the center of gravity imparts no moment about the axis of rotation. By biasing the ramp portion 110 toward the neutral position, the counterbalance assembly counteracts some or all of the weight of the ramp, thereby reducing the actuating force required to reciprocate the ramp assembly 100 between the stowed position and a deployed position. As a result, a smaller motor is required, and wear on that motor is reduced. One exemplary counterbalance suitable for use with the ramp assembly is disclosed in U.S. Pat. No. 7,681,272, issued to Morris et al., which is incorporated by reference herein. It will be appreciated that the counterbalance of Morris et al. is only one exemplary counterbalance suitable for use with the presently disclosed ramp assembly, and that any number of other suitable counterbalance assemblies can by utilized in conjunction with or in place of the referenced counterbalance.

As previously noted, when the ramp assembly 100 is in the stowed position, the ramp portion 110 is located such that the ramp portion is positioned over the intermediate panel 130 and the inner panel 150, and the lower surface 112 of the ramp portion 110 faces upward and is substantially coplanar, i.e., flush, with the floor (not shown) of the vehicle. When the ramp assembly 100 is in the stowed position, the intermediate panel 130 and the inner panel 150 are disposed within the frame 102. In the exemplary embodiment shown in FIG. 5, when the ramp assembly 100 is in the stowed position, the intermediate panel 130 and the inner panel 150 are positioned so that the upper surfaces of the panels 130 and 150 are generally oriented such that the roadside end of each panel is lower than the curbside end of that panel. It should be appreciated that the orientation of the intermediate panel 130 and the inner panel 150, relative to each other and to the frame 102 of the ramp assembly 100 when the ramp assembly, is in the stowed position may vary without departing from the scope of the disclosure.

Referring to FIGS. 1-10, the deployment motion of the ramp assembly 110 includes a first phase and a second phase. During the first phase, the ramp assembly 110 moves from the stowed position (FIGS. 1 and 5) to a first deployed position (FIGS. 3 and 7). As the ramp assembly 110 travels through the first phase, the support member 190 remains engaged with the locked latch mechanism 200. As a result, the axis 170 about which the ramp portion 110 is coupled to the intermediate panel 130 maintains a generally fixed location; although some movement of the axis 170 occurs as the intermediate panel rotates about the pinned connection to the latch mechanism 200.

To drive the ramp assembly 100 through the first phase, the motor 240 rotates the drive shaft 238 in a first direction to rotate both the drive arm 250 and the eccentric bearing element 164. As shown in FIGS. 12-15, rotation of the drive arm 250 rotates the ramp portion 110 about axis 170. At the same time, the eccentric bearing element 164 rotates to raise the roadside end 152 of the inner panel 150, thereby moving the inner panel from a lowered position to a raised position.

In the disclosed embodiment, the first deployment phase ends when the ramp portion 110 has rotated through a predetermined angle about axis 170. To determine the travel and, thus, the position of the ramp, a sensor (not shown) detects the position of the drive shaft 238. It should be appreciated that the type and position of the sensor is not limited to one that detects the position of the drive shaft 238, but can include sensors associated with the ramp portion 110, other parts of the drive system, the intermediate panel, the inner panel, or any other suitable portion of the ramp assembly.

As shown in FIG. 7, when the ramp assembly 100 is located in the first deployed position at the end of the first deployment phase, the intermediate panel 130 and the inner panel 150 have generally horizontal upper surfaces. The ramp portion 110 extends outward and downward toward the alighting surface 90. If the alighting surface 90 is a curb having sufficient height, the ramp portion 110 will contact the alighting surface, and the slope of the ramp portion 110 may be gradual enough that further deployment of the ramp assembly 100 through the second phase is unnecessary.

The second deployment phase begins when the actuator 214 rotates the pawl 206 to unlock the latch mechanism 200. Unlocking the latch mechanism 200 allows the support member 190 to disengage from the catcher 202. This, in turn, allows the curbside end 132 of the intermediate panel 130 and, therefore, axis 170 to move in a downward direction. If the ramp portion 110 is not already in contact with the alighting surface 90 when the ramp assembly is in the first deployed position and the latch mechanism is unlocked, then the weight of the ramp portion creates a moment about the bearing element 254 that tends to lift the curbside end 132 of the intermediate panel 130. As a result, the support member 190 remains engaged with the latch mechanism 200, and the ramp portion continues to rotate about generally fixed axis 170 until the ramp portion contacts the alighting surface 90.

Once the curbside end 118 of the ramp portion 110 contacts the alighting surface 90, either in the first deployed position or after the ramp portion has rotated through an initial part of the second deployment phase, further rotation of the drive arm 250 about axis 182 drives the bearing element 254 to rotate the ramp portion 110 about its curbside end 118. As the ramp portion 110 rotates about its curbside end 118, the hinge axis 170 moves in a downward direction, driving the support member 190 so that it disengages from the unlocked latch mechanism 200. Thus, the ramp portion 110, which rotated in a first direction relative to the intermediate panel 130 during the first deployment phase, now rotates in a second direction, opposite the first direction, relative to the intermediate panel during the second deployment phase. As a result, the ramp portion 110 and the intermediate panel 130, which are positioned relative to each other to form an angle of greater than 180° in the first deployed position, move such that the angle formed therebetween approaches approximately 180° when the ramp assembly 100 is in the second deployed position.

With the ramp portion 110 and the intermediate panel 130 forming an angle of approximately 180°, the ramp portion and the intermediate panel cooperate to provide a substantially flat transition surface from the inner panel 150 to the alighting surface 90. Although the ramp portion 110 and the intermediate panel 130 of the disclosed ramp assembly 100 form an angle of approximately 180° in the second deployed position, the distance between the vehicle floor and the alighting surface, road crown, the inclusion of a "kneeling" feature on the vehicle, the length of the ramp portion, and other factors can affect relative positions of the ramp portion and the intermediate panel in the second deployed position. Accordingly, it should be understood that the angle between the ramp portion 110 and the intermediate panel 130 in the second deployed position can vary. These and other variations in the configuration of the deployed ramp assembly are contemplated and should be considered within the scope of the disclosed subject matter.

In the illustrated embodiment, the second deployed position is reached when the intermediate panel 130 has achieved a predetermined angle relative to the inner panel 150. This predetermined angle is reached when the intermediate panel 130 contacts portions of the inner panel support 156 as shown in FIG. 8. In this manner, the inner panel support 156 acts as a stop to limit the downward travel of the hinge axis 170 during the second phase and also provides support to the intermediate panel 130 when the ramp assembly 100 is in a fully deployed position.

To move the ramp assembly 100 from a deployed position to the stowed position, the motor 240 rotates the drive shaft 238 in a reverse direction. This rotation moves the drive arm 250 to raise the curbside end 132 of the intermediate panel 130 until the support member 190 engages the latch mechanism 200. With the position of curbside end 132 of the intermediate panel 130 generally fixed by the latch mechanism 200, further rotation of the drive arm 250 rotates the ramp portion 110 about axis 170 until the ramp portion has returned to the stowed position. As the drive arm 250 drives the ramp portion 110 toward the stowed position, the eccentric bearing element 164 rotates to lower the roadside end 152 of the inner panel 150 until the inner panel has returned to its lowered position.

Referring now to FIGS. 16-23B, a ramp assembly 100 with an alternative drive assembly 230 is illustrated. The illustrated embodiment is similar to the previously described embodiment, but instead uses a linkage 270 to transfer the driving force from the motor 240 (actuator) to the ramp portion 110. Similar to the previously described embodiment, a drive arm 272 is fixedly coupled to the curbside sprocket 234. The drive arm 272 extends radially from the curbside sprocket 234 so that the drive arm rotates with the curbside sprocket 234 about a common axis of rotation.

The drive arm 272 is connected to the ramp portion 110 by a link 274 that is rotatably coupled at one end to the drive arm 272 and at the other end to the ramp portion 110. The linkage 270 formed by the drive arm 272 and the link 274 is a scissor-type linkage that is capable of providing a driving force to the ramp portion from the motor 240. As the drive assembly rotates the curbside sprocket 234, the drive arm 272 drives the link 274 to apply a moment to the ramp portion, thereby reciprocating the ramp portion between the stowed position (FIG. 20A) and a deployed position (FIG. 23A). Moreover, as shown in FIGS. 20A, 21A, 22A, and 23A, the angle between the drive arm 272 and the link 274 changes throughout the ramp motion to account for the fact that the ramp portion 110 and the drive arm 272 rotate about different axes.

It should be appreciated that the illustrated linkage is exemplary only and should not be considered limiting. In this regard, the position and lengths of the drive arm 272 and link 274 can vary. In addition, alternate linkage configurations that utilize one or more additional rotating or sliding links, or any other known linkage configuration can be utilized to drive the ramp portion 110. Further, the linkage need not be coupled to a sprocket, but can be coupled to a rotary or linear actuator either directly or indirectly using a known transmission configuration. These and other alternate embodiments suitable for coupling a linkage to the ramp portion to drive the ramp portion between the stowed position and a deployed position are contemplated and should be considered within the scope of the present disclosure.

Referring now to FIGS. 18, 19, 20B, 21B, 22B, and 23B, a cam surface 300 is formed on the upper edge of the roadside end 120 (when the ramp is in a deployed position) of each of the side curbs 116. A corresponding cam follower 302 is mounted to each side of the ramp assembly 100 about an axis that maintains a fixed position relative to the vehicle. In the illustrated embodiment, the cam follower 302 is a roller bearing rotatably mounted about the axis of rotation 182 of the drive arm 272.

Figure 20A:
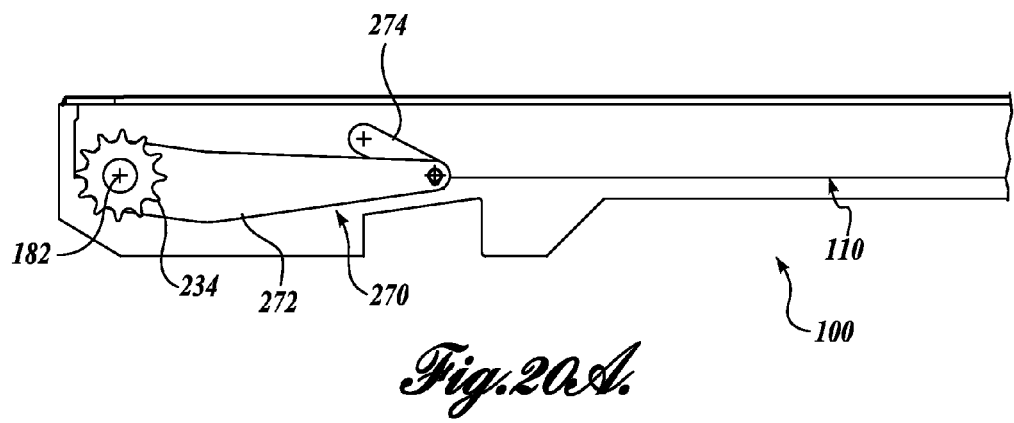
FIG. 20A is a partial side view of the ramp assembly shown in FIG. 16, showing a linkage when the ramp portion is in the stowed position.
Figure 20B:
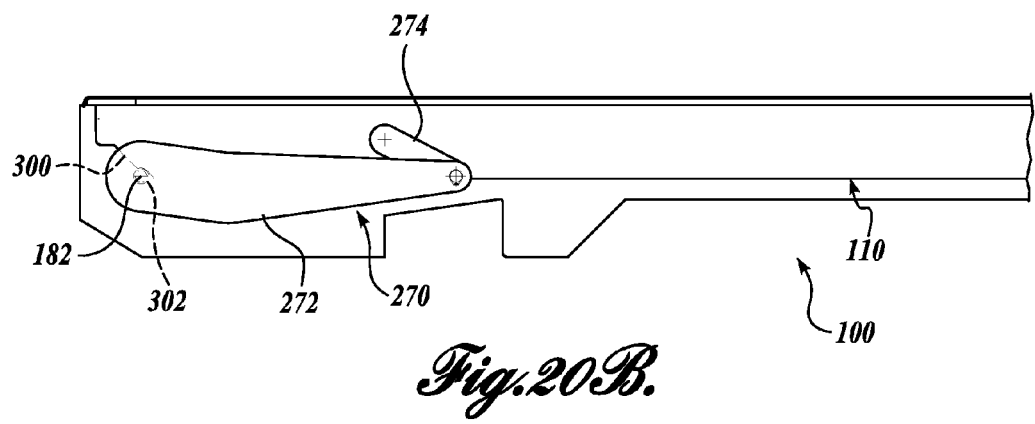
FIG. 20B is a partial side view of the ramp assembly shown in FIG. 16, showing a cam surface and cam follower when the ramp portion is in the stowed position.
Figure 21A:
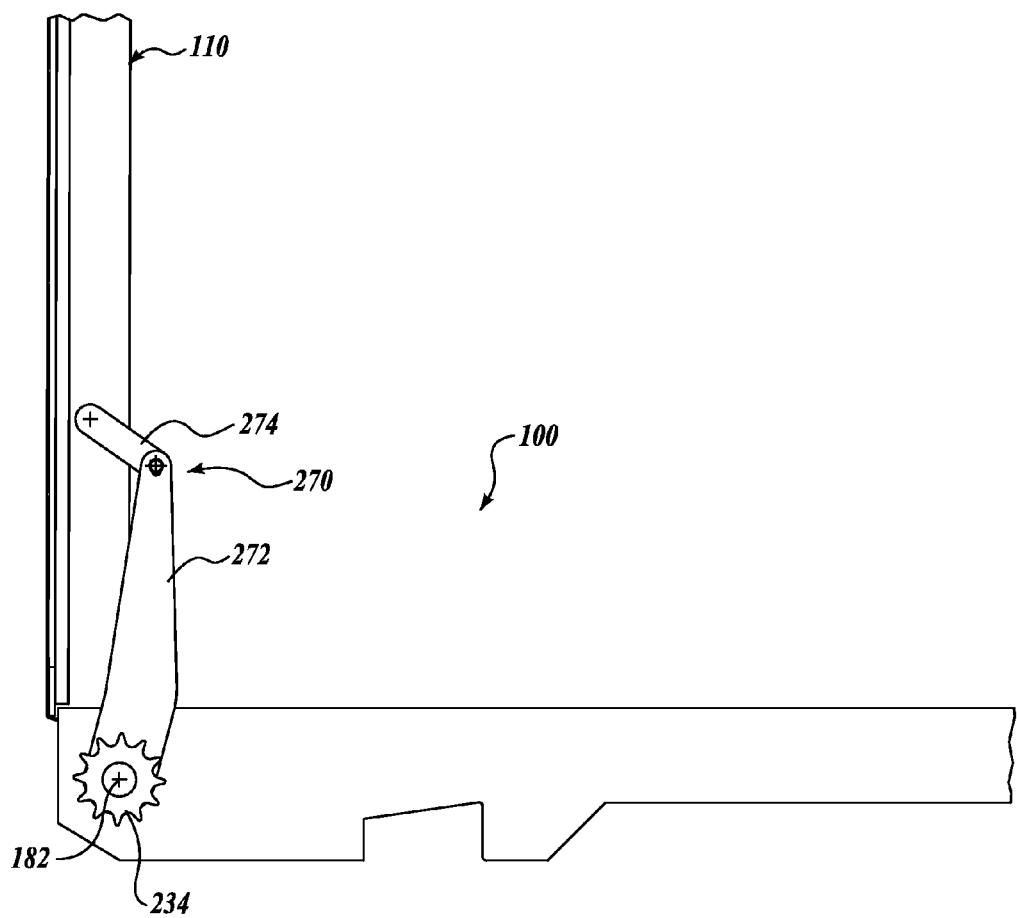
FIG. 21A is a partial side view of the ramp assembly shown in FIG. 16, showing the linkage when the ramp portion is in a neutral position.
Figure 21B:
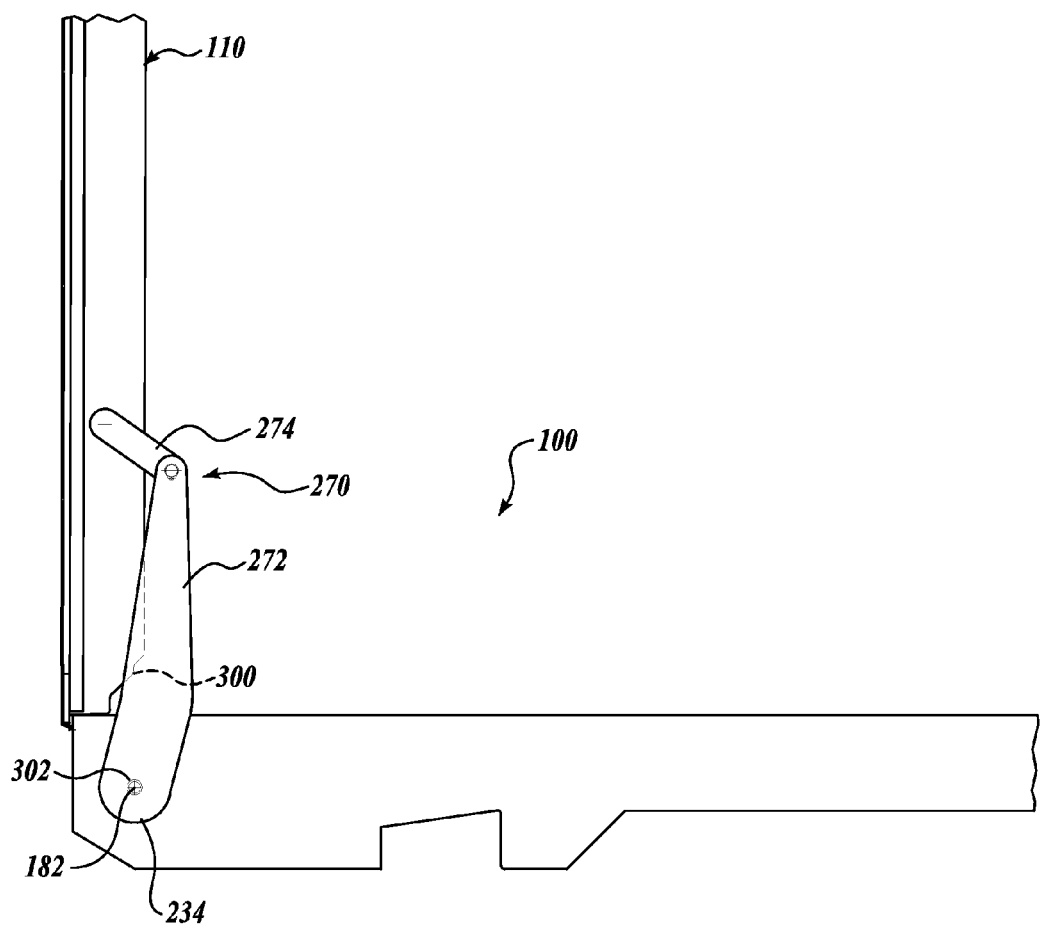
FIG. 21B is a partial side view of the ramp assembly shown in FIG. 16, showing the cam surface and cam follower when the ramp portion is in a neutral position.

As best shown in FIG. 20B, when the ramp assembly 100 is in the stowed position, the cam follower 302 is engaged with the cam surface 300 to support the roadside end 120 of the ramp portion 110. Because the cam follower 302 is secured about an axis that is fixed relative to the vehicle, the engagement of the cam follower 302 with the cam surface 300 provides added stability to the ramp panel 114, thereby limiting movement of upward facing lower surface 112 of ramp panel 114 as passengers step on the ramp assembly 100. As the ramp assembly 100 moves from the stowed position to the deployed position, the motion of the ramp portion 110 moves the cam surface 300 such that the cam follower 302 disengages from the cam surface. (See FIGS. 21B, 22B, and 23B.) The illustrated exemplary embodiment of the ramp assembly is described with the understanding that alternate embodiments exist within the scope of the present disclosure. In one alternate embodiment, the ramp assembly does not include a movable inner panel. Instead, the inner panel maintains a fixed position relative to the vehicle floor through the entire ramp motion. For such an embodiment, an eccentric bearing member is not required. In another alternate embodiment, the ramp assembly does not include an inner panel; instead, the intermediate panel is rotatably associated with the floor of the vehicle.

Another alternate embodiment of the disclosed ramp assembly uses one or more separate actuators to drive the motion of the ramp through the second deployment phase, i.e., to lower the hinged connection between the ramp portion and the intermediate panel. Moreover, the actuator or actuators are not limited to the disclosed electric motor. One of skill in the art will appreciate that the ramp assembly can be modified to use a number of different types of actuators, including linear actuators, pneumatic actuators, hydraulic actuators, and any other suitable devices for moving the ramp assembly through the deployment motion.

Various embodiments utilizing different control methods are also contemplated. In one embodiment, an operator activates a single switch to deploy and stow the ramp assembly 100. When the switch is activated, the ramp assembly deploys through the first and second deployment phases regardless of the distance between the alighting surface and the vehicle floor. In one alternate embodiment, sensors detect when the ramp portion contacts the alighting surface and, based on the slope of the ramp portion at that position, a controller determines whether or not deployment through the second deployment phase is necessary. In yet another possible embodiment, the operator selectively activates one of two switches, depending on the type of alighting surface. If the alighting surface is a curb, the operator activates the corresponding switch, and the ramp portion moves through the first deployment phase until the ramp portion contacts the curb. If the alighting surface is a road, then the operator activates the second switch, and the ramp assembly deploys through the first and second deployment phases to provide a transition surface between the road and the vehicle floor. In yet another contemplated embodiment, the operator can selectively control the rotation of the drive arm 250 and the release of the latching mechanism 200 to control the ramp assembly so that the ramp portion and the intermediate panel, respectively, are at desired orientations throughout the deployment of the ramp assembly.

While illustrative embodiments have been illustrated and described, it will be appreciated that various changes can be made therein without departing from the spirit and scope of the disclosed subject matter.

The invention claimed is:

1. A ramp assembly for a providing a transition surface from a vehicle floor to an alighting surface, the ramp assembly comprising:
   (a) a ramp portion coupled for reciprocating movement between a stowed position and a deployed position, the ramp portion having a cam surface disposed thereon;
   (b) a cam follower having a first axis fixedly located relative to the vehicle floor, the cam follower engaging the cam surface when the ramp portion is in the stowed position to support the ramp portion;
   (c) a panel, a first end of the panel being rotatably coupled to a first end of the ramp portion about a second axis;
   (d) a drive arm rotatable about a third axis and operably coupled to the ramp portion; and
   (e) an actuator operably coupled to the drive arm to rotate the drive arm about the third axis, rotation of the drive arm driving the ramp portion through a first phase and a second phase of a deployment motion, wherein:
      (i) the first phase comprises the drive arm rotating the ramp portion about the second axis, wherein the second axis maintains a substantially fixed position; and (ii) the second phase comprises the drive arm moving the second axis in a downward direction, wherein the second phase is subsequent to the first phase.

2. The ramp assembly of claim 1, wherein the cam follower disengages from the cam surface during the first phase. surface during the second phase.

3. The ramp assembly of claim 2, wherein the cam follower is disengaged from the cam surface during the second phase.

4. The ramp assembly of claim 1, further comprising a link, a first end of the link being rotatably coupled to the drive arm, a second end of the link being rotatably coupled to the ramp portion.

5. The ramp assembly of claim 1, wherein the ramp portion comprises a bearing element at least partially disposed within a slot formed in the drive arm, the drive arm engaging the bearing element to reciprocate the ramp portion between the stowed position and the deployed position.

6. The ramp assembly of claim 1, wherein the drive arm comprises a bearing element at least partially disposed within a slot formed in the ramp portion, the bearing element engaging the ramp portion to reciprocate the ramp portion between the stowed position and the deployed position.

7. A ramp assembly, comprising:
(a) a ramp portion coupled for rotational movement between a stowed position and a deployed position, the ramp portion comprising a side curb with a cam surface disposed thereon;
(b) a panel, a curbside end of the panel being rotatably coupled to the ramp portion about a first axis;
(c) an elongate drive arm extending radially from a second axis, the drive arm being operably coupled to the ramp portion;
(d) an actuator operably coupled to the drive arm to rotate the drive arm about the second axis, rotation of the drive arm moving the ramp portion through a deployment motion, the deployment motion comprising:
(i) a first phase, wherein the drive arm rotates the ramp portion about the first axis; and
(ii) a second phase, wherein the drive arm moves the first axis from a raised position to a lowered position; and
(e) a cam follower having an axis fixedly positioned relative to the vehicle floor, the cam follower engaging the cam surface when the ramp portion is in the stowed position to support the ramp portion.

8. The ramp assembly of claim 7, wherein the cam follower disengages from the cam surface during the first phase.

9. The ramp assembly of claim 8, wherein the cam follower is disengaged from the cam surface during the second phase.

10. The ramp assembly of claim 7, further comprising a link, a first end of the link being rotatably coupled to the drive arm, a second end of the link being rotatably coupled to the ramp portion.

11. The ramp assembly of claim 7, wherein the ramp portion comprises a bearing element at least partially disposed within a slot formed in the drive arm, the drive arm engaging the bearing element to reciprocate the ramp portion between the stowed position and the deployed position.

12. The ramp assembly of claim 7, wherein the drive arm comprises a bearing element at least partially disposed within a slot formed in the ramp portion, the bearing element engaging the ramp portion to reciprocate the ramp portion between the stowed position and the deployed position.

13. A ramp assembly for a providing a transition surface from a vehicle floor to an alighting surface, the ramp assembly comprising:
(a) a ramp portion coupled for reciprocating movement between a stowed position and a deployed position, the ramp portion having a cam surface disposed thereon;
(b) a cam follower fixedly located relative to the vehicle floor, the cam follower engaging the cam surface when the ramp portion is in the stowed position to support the ramp portion, the cam follower being disengaged from the cam surface when the ramp portion is in a deployed position; and
(c) a panel, a first end of the panel being rotatably coupled to a first end of the ramp portion about an axis, wherein (1) the axis maintains a fixed position during a first phase of a deployment motion; (2) the axis moves in a downward direction during a second phase of the deployment motion. first panel, a curbside end of the first panel being rotatably coupled to a first end of the ramp portion about a first axis;

14. The ramp assembly of claim 13, wherein the second phase is subsequent to the first phase.

15. The ramp assembly of claim 13, further comprising an actuator operably associated with the ramp portion, the actuator driving the ramp portion through the first and second phases of the deployment motion, wherein:
(a) the actuator rotates the ramp portion about the axis during the first phase; and,
(b) the actuator moves the axis in a downward direction during the second phase.

16. The ramp assembly of claim 13, wherein the cam follower disengages from the cam surface during the first phase.

17. The ramp assembly of claim 16, wherein the cam follower is disengaged from the cam surface during the second phase.

18. A ramp assembly, comprising:
(a) a ramp portion coupled for rotational movement between a stowed position and a deployed position, the ramp position comprising a side curb with a cam surface disposed thereon;
(b) a panel, a curbside end of the panel being rotatably coupled to the ramp portion about an axis;
(c) an actuator operably associated with the ramp portion to drive the ramp portion through a deployment motion, the deployment motion comprising:
(i) a first phase, wherein the actuator rotates the ramp portion about the axis; and
(ii) a second phase, wherein the actuator moves the axis from a raised position to a lowered position; and
(d) a cam follower fixedly positioned relative to the stowed position of the ramp position, the cam follower engaging the cam surface when the ramp portion is in the stowed position to support the ramp portion.

19. The ramp assembly of claim 18, wherein the cam follower disengages from the cam surface during the first phase.

20. The ramp assembly of claim 19, wherein the cam follower is disengaged from the cam surface during the second phase.

21. The ramp assembly of claim 18, wherein the axis maintains a fixed position during the first phase of a deployment motion.

* * * * *